(12) United States Patent
Schlanger

(10) Patent No.: US 9,216,611 B2
(45) Date of Patent: Dec. 22, 2015

(54) VEHICLE WHEEL RIM

(71) Applicant: Raphael Schlanger, Wilton, CT (US)

(72) Inventor: Raphael Schlanger, Wilton, CT (US)

( * ) Notice: Subject to any disclaimer, the term of this patent is extended or adjusted under 35 U.S.C. 154(b) by 234 days.

(21) Appl. No.: 13/941,243

(22) Filed: Jul. 12, 2013

(65) Prior Publication Data

US 2013/0320748 A1    Dec. 5, 2013

Related U.S. Application Data

(63) Continuation-in-part of application No. 12/661,154, filed on Mar. 11, 2010, now Pat. No. 8,528,991.

(60) Provisional application No. 61/209,813, filed on Mar. 12, 2009.

(51) Int. Cl.
| | |
|---|---|
| *B60B 7/01* | (2006.01) |
| *B60B 7/04* | (2006.01) |
| *B60B 7/06* | (2006.01) |
| *B60B 1/00* | (2006.01) |
| *B60B 21/02* | (2006.01) |
| *B60B 21/04* | (2006.01) |
| *B60B 25/00* | (2006.01) |

(52) U.S. Cl.
CPC . *B60B 7/01* (2013.01); *B60B 1/003* (2013.01); *B60B 7/06* (2013.01); *B60B 7/063* (2013.01); *B60B 21/025* (2013.01); *B60B 21/04* (2013.01); *B60B 25/00* (2013.01); *B60B 7/04* (2013.01); *B60B 2310/218* (2013.01); *B60B 2900/111* (2013.01); *B60B 2900/113* (2013.01); *B60B 2900/1216* (2013.01)

(58) Field of Classification Search
CPC .... B60B 21/02; B60B 21/025; B60B 21/062; B60B 1/003; B60B 7/0006; B60B 7/01; B60B 7/04; B60B 7/063; B60B 25/00
See application file for complete search history.

(56) References Cited

U.S. PATENT DOCUMENTS

| | | | | |
|---|---|---|---|---|
| 138,624 | A * | 5/1873 | Everett | 301/99 |
| 5,080,444 | A * | 1/1992 | Hopkins et al. | 301/95.107 |
| 5,104,199 | A * | 4/1992 | Schlanger | 301/64.704 |
| 5,249,846 | A * | 10/1993 | Martin et al. | 301/95.102 |
| 5,415,463 | A * | 5/1995 | Olson et al. | 301/64.702 |
| 5,893,614 | A * | 4/1999 | Dennis | 301/37.41 |
| 5,975,645 | A * | 11/1999 | Sargent | 301/95.11 |
| 2003/0107260 | A1* | 6/2003 | Ording et al. | 301/95.102 |
| 2007/0029868 | A1* | 2/2007 | Chen | 301/95.102 |
| 2007/0057567 | A1* | 3/2007 | Jager | 301/95.102 |
| 2007/0200422 | A1* | 8/2007 | Davis et al. | 301/95.106 |
| 2008/0174168 | A1* | 7/2008 | Yang | 301/95.102 |
| 2008/0315676 | A1* | 12/2008 | Cobb | 301/95.102 |

FOREIGN PATENT DOCUMENTS

| | | | |
|---|---|---|---|
| FR | 2707559 A1 * | 1/1995 | |
| FR | 2722735 A1 * | 1/1996 | |
| WO | WO 9718098 A1 * | 5/1997 | |

* cited by examiner

*Primary Examiner* — Kip T Kotter

(57) ABSTRACT

A vehicle wheel, including: a peripheral rim with a radially outboard spoke bed and an apex region radially inboard from the spoke bed portion; a central hub with a hub flange; and a plurality of spokes extending between the rim and hub, with a first portion connected to the spoke bed and a second portion connected to the hub flange. The apex region includes a first apex portion and a second apex portion adjacent the first apex portion and a seam between the first apex portion and the second apex portion. Including a spanning element to span across said seam to retain said first apex portion to said second apex portion.

42 Claims, 14 Drawing Sheets

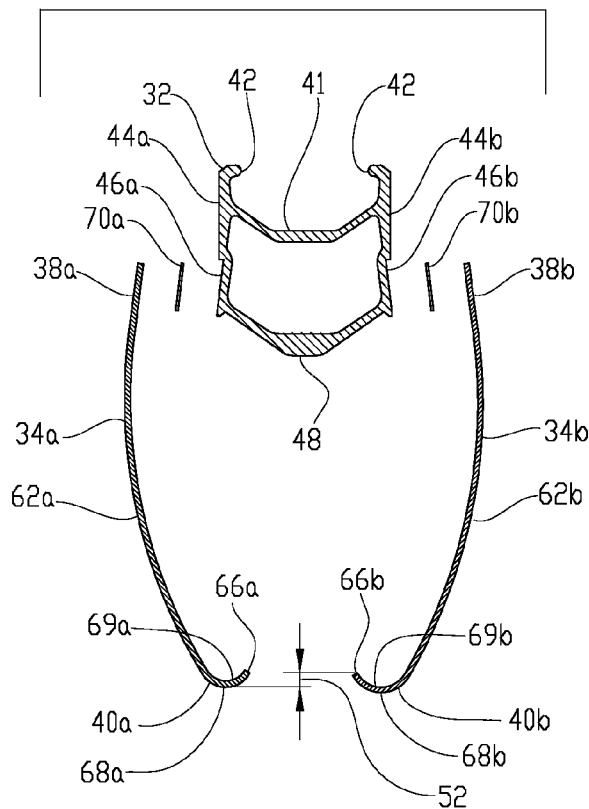
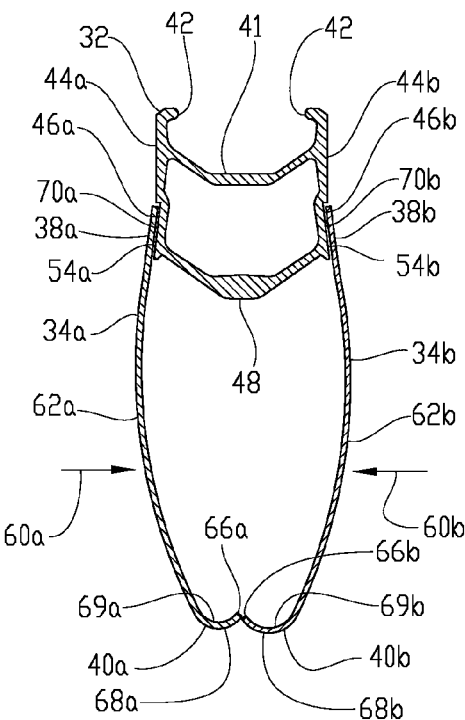
FIG. 2e
FIG. 2f
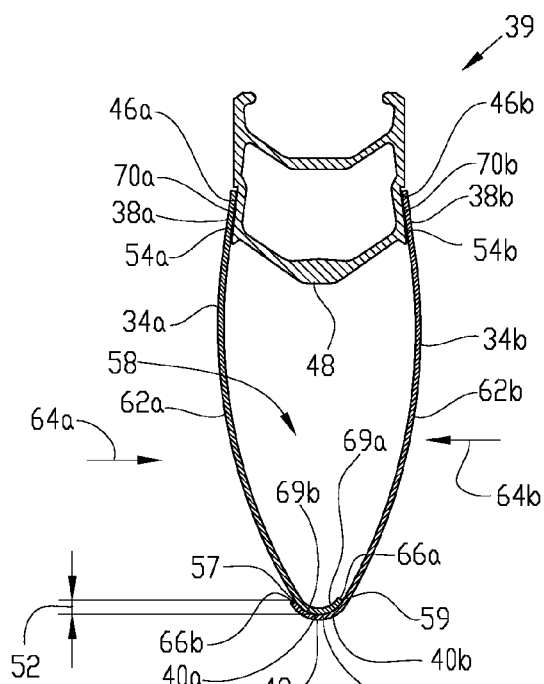
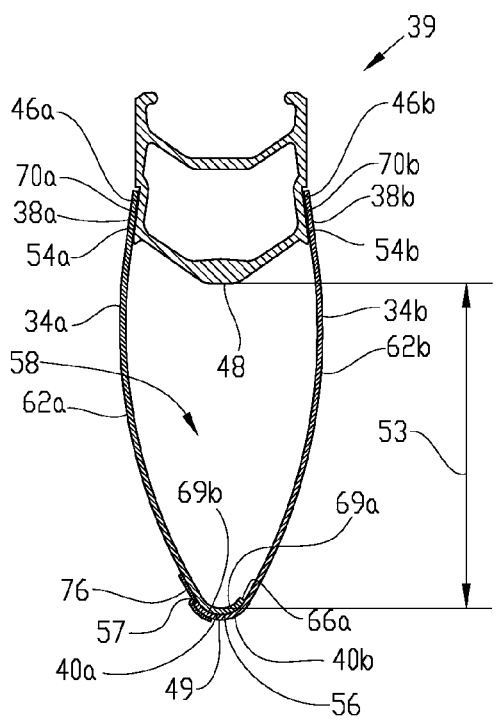
FIG. 2g
FIG. 2h

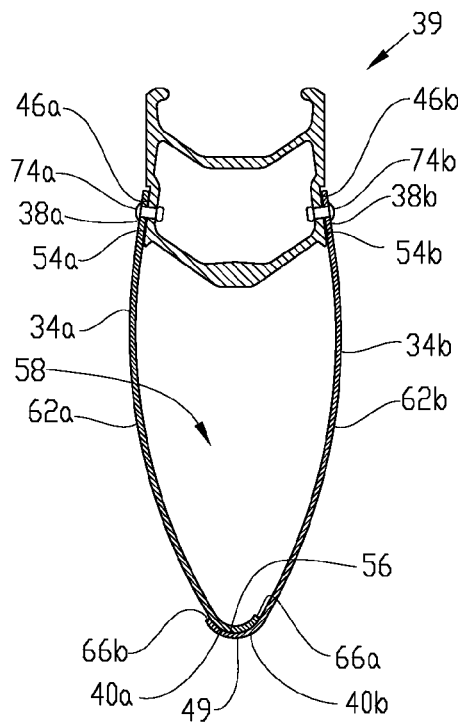
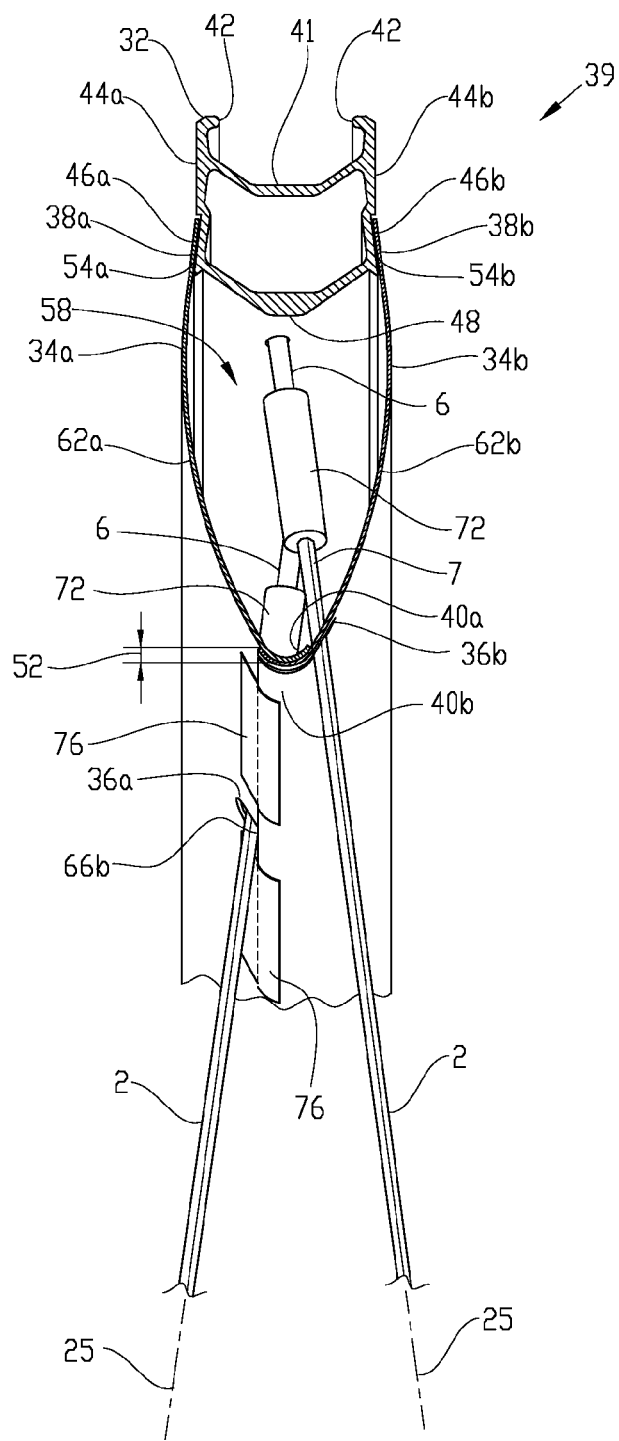
FIG. 2i
FIG. 2j

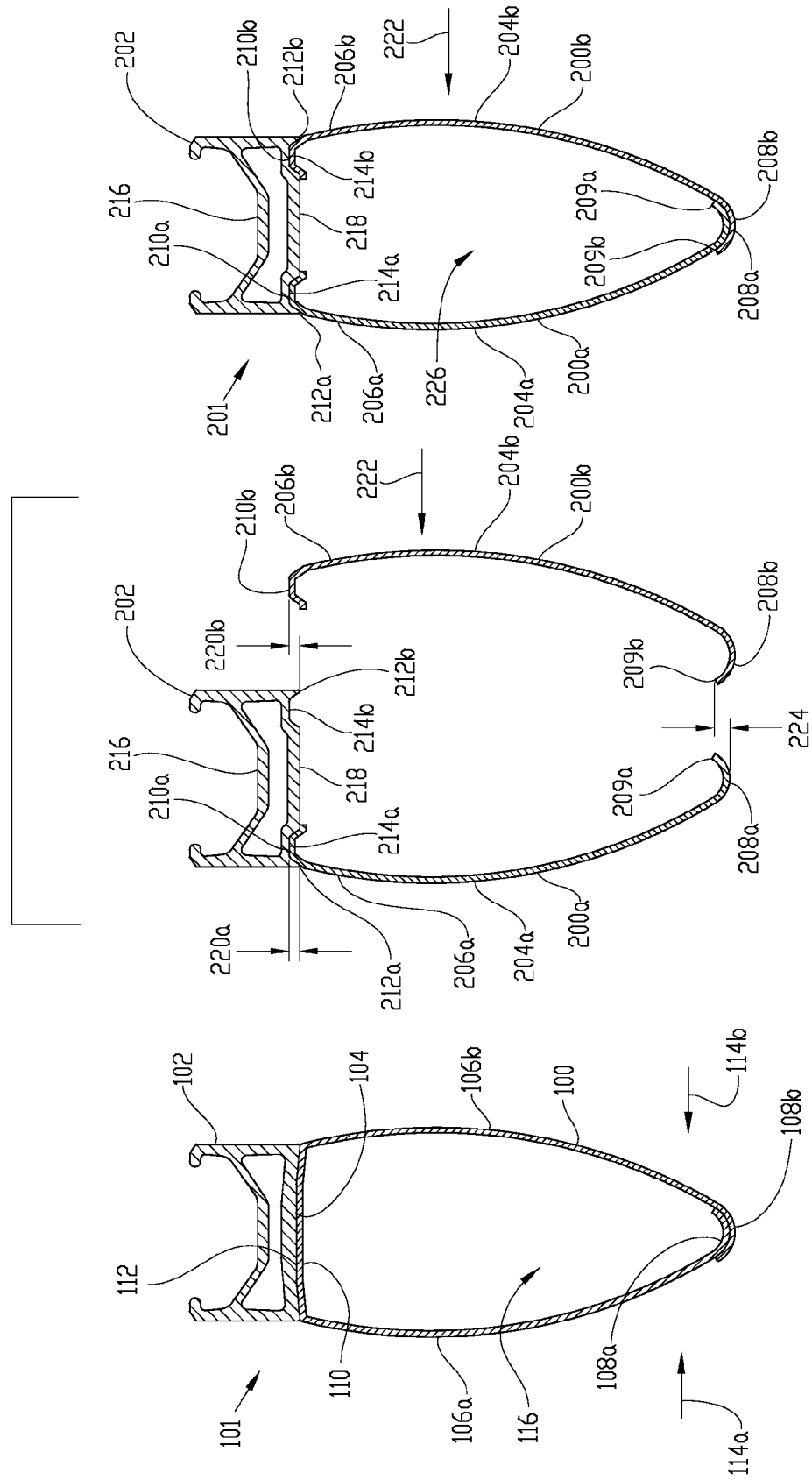

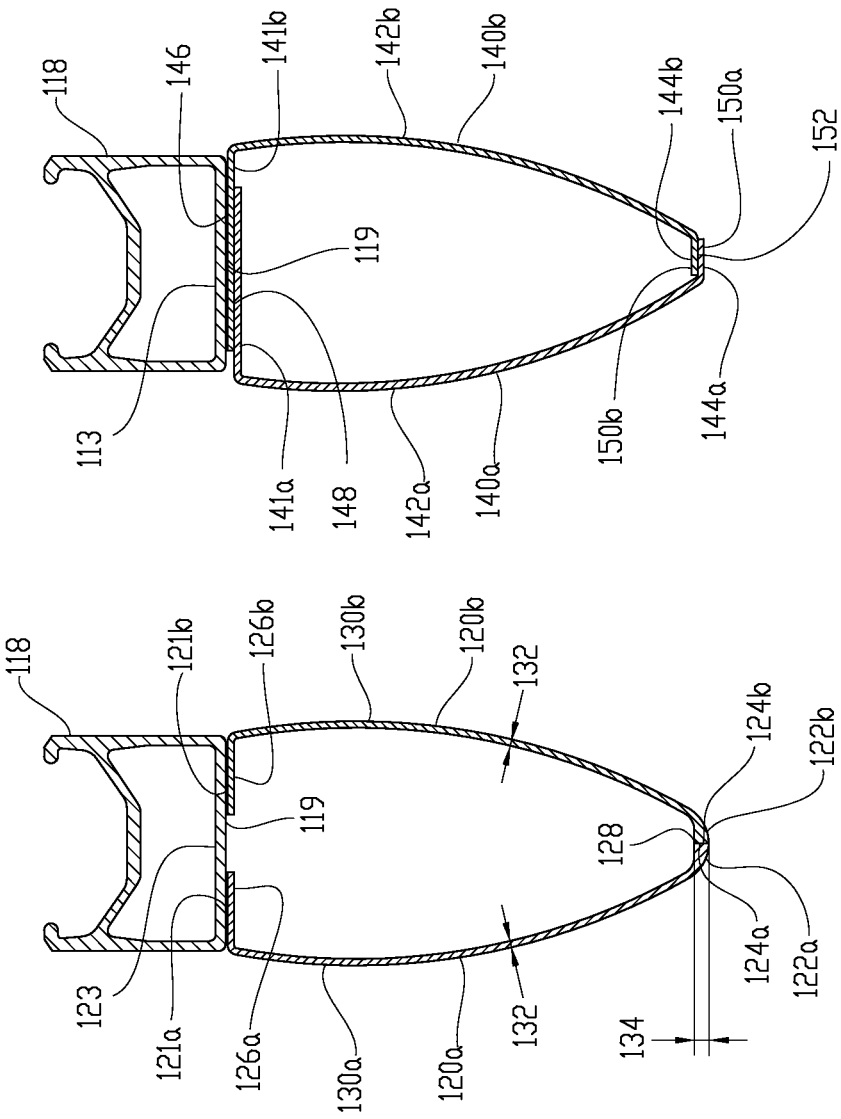

VEHICLE WHEEL RIM

CROSS-REFERENCE TO RELATED APPLICATION

This application claims priority of U.S. patent application Ser. No. 12/661,154, filed Mar. 11, 2010, and entitled "VEHICLE WHEEL RIM", which claims priority of U.S. provisional patent application 61/209,813, filed Mar. 12, 2009, and entitled "VEHICLE WHEEL RIM".

BACKGROUND OF THE INVENTION

Description of Prior Art

In the design of high performance bicycle wheels, in addition to strength, stiffness and durability, it is an object to make the wheels as aerodynamic and as aesthetically pleasing as possible. This usually involves increasing the depth of the rim cross section. these "deep-section" rims provide greatly improved aerodynamics in comparison with more conventional shallow-section rimmed wheels. In the past decade, these deep-section wheels have become commonplace. These rims are usually produced simply as elongated conventional rims, where the spokes are fastened to the rim at the spoke bed at the radially inboard apex of the rim.

However, increasing the radial depth of the rim has several disadvantages. Firstly, these deeper section rims utilize more material and are therefore much heavier. These rims require additional structural material to span and structurally connect the spoke bed with the tire bed. In an effort to ameliorate this weight penalty, many makers have resorted to producing the deep-section rims out of carbon fiber or other exotic materials, which makes the rim very expensive. Further, these deep-section rims have very high radial stiffness. In comparison with their more supple shallow-section counterparts, the additional rigidity of deep-section rims results in a rougher ride, with greater rider fatigue and reduced vibration damping and stability. Still further, some spoke makers include enlarged portions near the ends of their spokes. With conventional rims, the spoke attachment point is at the inboard apex of the rim, which does not allow the rim to conceal or shield these enlarged portions of the spoke, resulting in reduced aesthetics and increased aerodynamic resistance. Yet further, these conventional deep-section rims do not provide any access to the interior cavity of the rim profile. This limits the choice of spoke attachment systems to only the most conventional designs and does not allow for greater flexibility in alternate spoke and rim designs that may provide performance advantages such as lighter weight and improved responsiveness.

A limited number of manufacturers have produced rim models that are basically constructed as a conventional shallow-section outer rim with a thin nonstructural deep-section fairing bonded to the radially inboard side of the rim. This one-piece fairing serves to provide the deep-section appearance and improved aerodynamics. In these cases, the spokes pierce through holes in the fairing and extend radially outboard to their attachment points in the spoke bed of the outer rim.

However, these fairing portions are generally produced as "U"-shaped profiles, which require a large amount of manual labor and molding complexity to achieve. With increased labor, increased molding cycle time, and increased material cost, the resulting assembly is very expensive to produce. Also, since this fairing is a one-piece element that is bonded to the outer rim at both legs of the "U", there is also no access to the hollow interior of the fairing/rim cavity, which again limits spoke design and connection options. Further, since the fairing completely surrounds the radially inboard region adjacent the spoke bed, this limits spoke connection design options even further. Still further, since the spoke holes in the fairing are radially inboard of the spoke bed, it is difficult to visually see the spoke connection and also to align the spoke connection at the spoke bed. This makes assembly and field service much more difficult.

SUMMARY OF THE INVENTION

The present invention utilizes a rim design where the structural spoke bed of the outer rim is located radially outboard of the apex region. However, the rim includes a circumferential seam or split adjacent the apex region, which allows the apex region be axially separated into two parts. And also allows the apex region to be axially joined together.

This separable/joinable apex region design provides several advantages. Firstly, the rim assembly may be made to include two rim shell portions that may each be separately formed and then assembled back-to-back in a clamshell design. This split design greatly simplifies the molding and/or processing involved to form the parts as they may now be molded with a simple axial draw between mold halves, which reduces processing cost. This also means that the clamshell portions may be produced from simple sheet material of generally uniform thickness, which is generally very economical. Further, the amount of manual labor required for molding is greatly reduced in comparison with prior art designs. It is envisioned that these rim shells may be produced in a vacuum-forming and/or pressure-forming process, indeed a very economical process that would be impossible with prior art rim designs.

Further, since only the outer rim portion is now required to support the spoke connections, the rim shells may be made of very lightweight material, which results in a completed rim assembly that may be lighter in weight than prior art designs. Still further, the rim shells provide the aerodynamic and aesthetic benefits that customers are looking for. Yet further, since the rim shells do not support the spoke connections, they may be allowed to flex slightly, which reduced the overall radial rigidity of the rim assembly, for greater rider comfort and stability than prior art rim designs.

Also, this split design permits a seam that may be separated to provide access to the interior cavity of the rim assembly. This means that there is a wide range of alternate spoke connection designs that may be utilized with the present invention, which will provide enhanced performance and strength of the completed wheel assembly. Furthermore, with access to the interior cavity of the rim assembly, the rim cavity may be used to shield and enclose enlarged portions of the spoke(s), which further aids in aerodynamics and also adds to the available flexibility of the spoke design. Additionally, the interior access afforded by this split design provides easier assembly and lacing and also easier service in the field.

The present invention provides a wide range of options in the openings utilized to allow the spokes to pierce through the rim shell. The rim shell may be slotted to allow for passage of the spoke. This allows the rim shell to be assembled after the spoke is connected to the outer rim. It also allows the rim shell to be separated while the spokes remain connected to the outer rim. This provides tremendous design flexibility and ease of assembly and service that is not possible with prior art rim designs.

Further objects and advantages of my invention will become apparent from considering the drawings and ensuing description.

BRIEF DESCRIPTION OF THE DRAWINGS

The present invention will be more readily understandable from a consideration of the accompanying drawings, wherein:

FIGS. 2e-h are cross-sectional views of the embodiment of FIG. 2b, taken along 22-22, showing the embodiment of FIG. 2b in progressive stages of assembly;

FIG. 2e is a cross section view corresponding to the assembly sequence described in FIG. 2a.

FIG. 2f is a cross section view corresponding to an intermediate assembly sequence after the assembly sequence described in FIG. 2a and prior to the assembly sequence described in FIG. 2b.

FIG. 2g is a cross section view corresponding to the assembly sequence described in FIG. 2b.

FIG. 2h is a cross section view corresponding to an intermediate assembly sequence after the assembly sequence described in FIG. 2b, including the application of self-adhesive tape positioned to span across the seam.

FIG. 2i is a cross-sectional view of an alternate embodiment similar to the embodiment of FIG. 2b, taken along 22-22, including rim shells joined to the outer rim by means of mechanical fasteners;

FIG. 2j is a cross-sectional view of the embodiment of FIG. 2b, taken along 22-22, including an enlarged portion of the spoke enclosed by the rim shells;

FIG. 3a is a cross-sectional view, similar the view of FIG. 2d, showing a second embodiment of the present invention, including a one-piece rim shell;

FIGS. 3b-c is a cross-sectional view, similar the view of FIG. 2d, showing a third embodiment of the present invention in successive stages of assembly, including a radial overlie engagement between the rim shell and the outer rim;

FIG. 3d is a cross-sectional view, similar the view of FIG. 2d, showing a fourth embodiment of the present invention, including an axial overlap joint between the rim shell and the outer rim and a butt joint between the rim shells;

FIG. 3e is a cross-sectional view, similar the view of FIG. 2d, showing a fifth embodiment of the present invention, including an axial overlap joint between the rim shells and between a rim shell and the outer rim;

DETAILED DESCRIPTION OF THE INVENTION

Figure 1A:
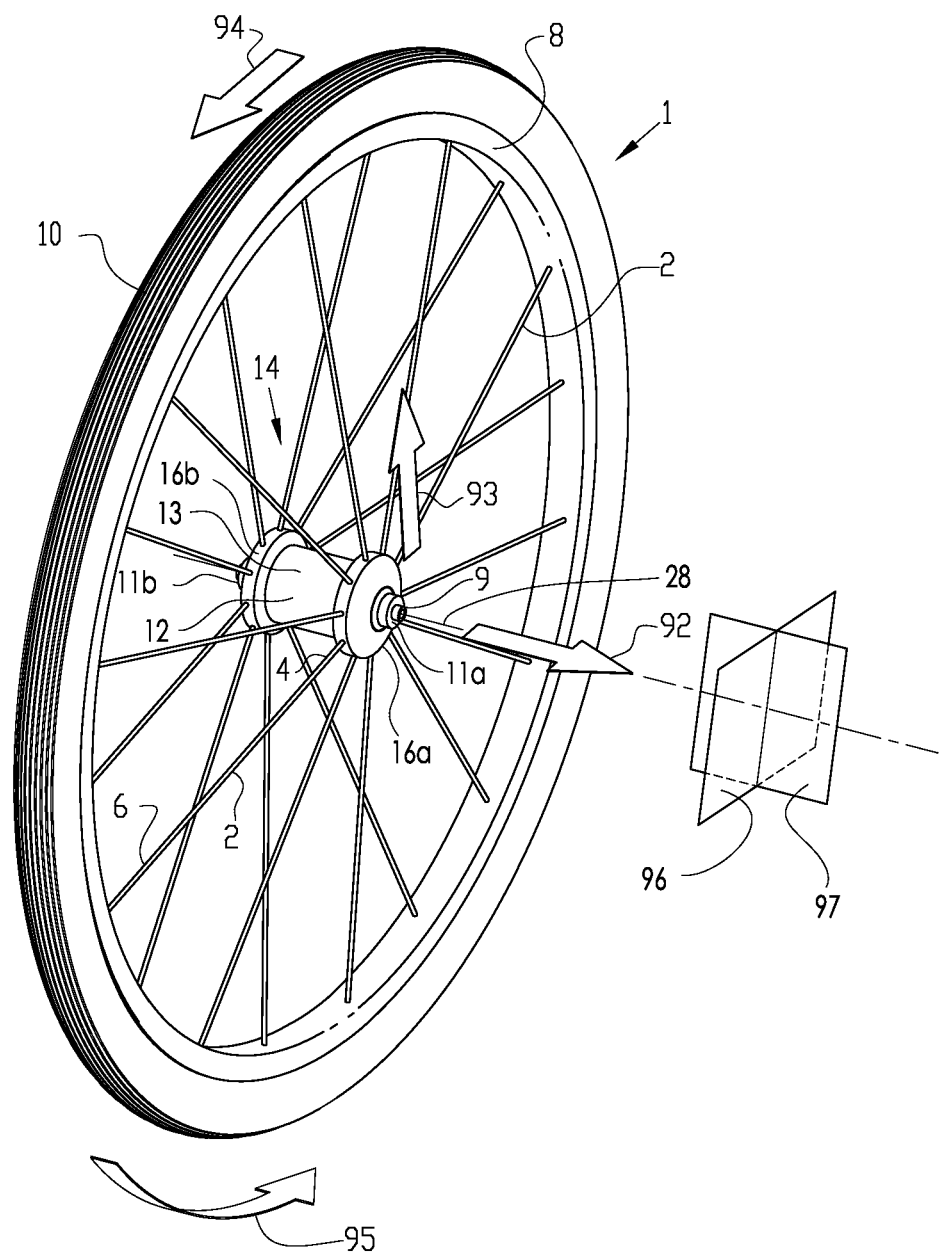
FIG. 1a is a perspective view schematically illustrating the general configuration of a prior art vehicle wheel as applied to a bicycle wheel.
Figure 2A:
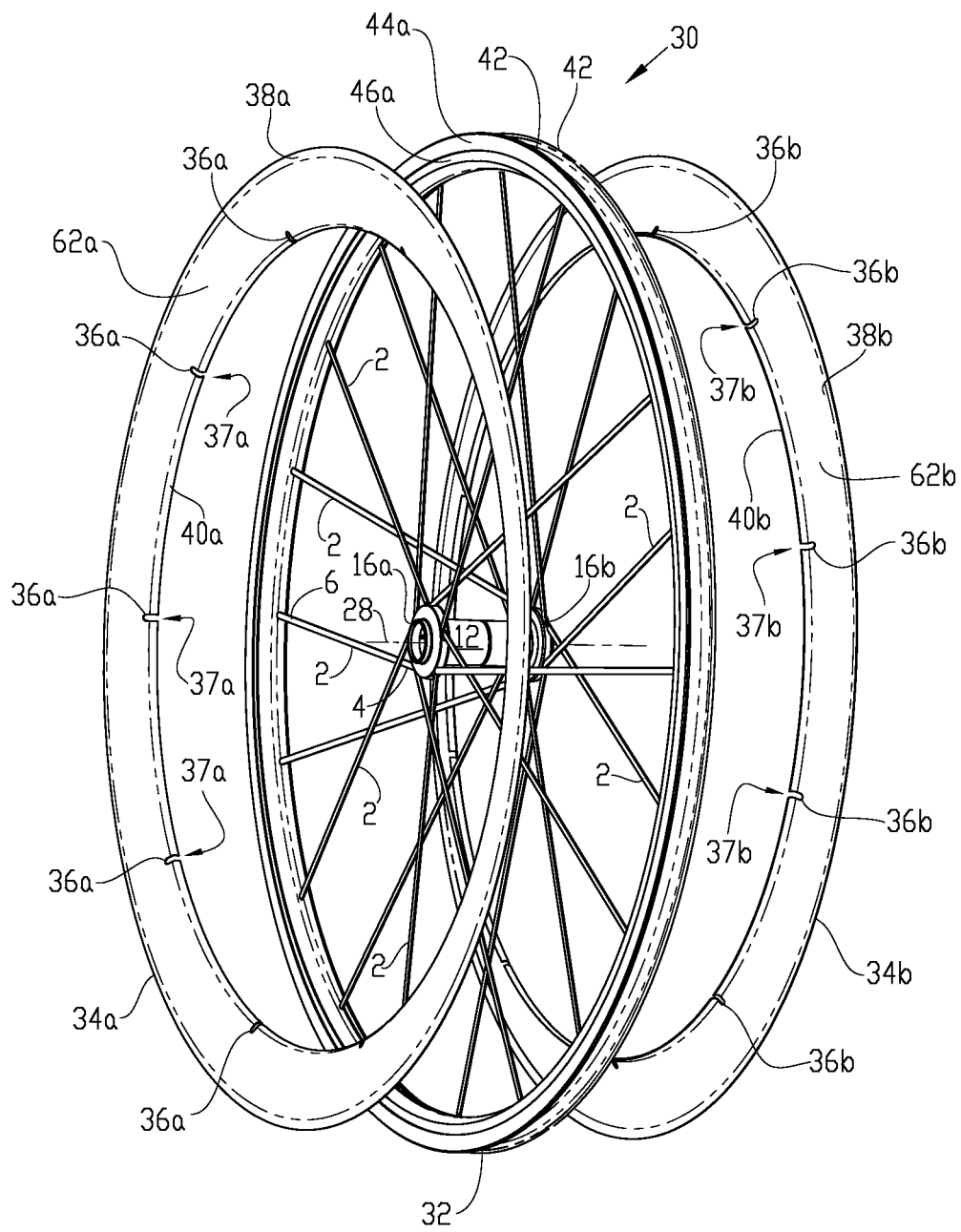
FIG. 2a is an exploded perspective view of an embodiment of the present invention, showing a bicycle wheel with rim shells prior to their assembly with the outer rim.

FIG. 1a describes the basic configuration of an exemplary vehicle wheel, in particular, a bicycle wheel 1, as well as a description of the direction conventions used throughout this disclosure. The hub shell 14 is rotatable about the axle 9 and includes at least two axially spaced hub flanges 16a and 16b (as shown in FIG. 2a), each of which include a means for connecting with the spokes 2. The hub flanges 16a and 16b may be contiguous with the hub shell 14 or they may be separately formed and assembled to the hub body 12 portion of the hub shell 14. The spokes 2 are affixed to their respective hub flanges 16a and 16b at their first end 4 and extend to attach the rim 8 at their second end 6. The tire 10 is fitted to the outer periphery of the rim 8. The wheel of FIG. 1a is generic and may be of tension-spoke or compression-spoke design.

The axial direction 92 is a direction parallel with the axial axis 28. The radial direction 93 is a direction generally perpendicular to the axial direction 92 and extending generally from the axial axis 28 radially outwardly toward the rim 8. The tangential direction 94 is a direction perpendicular to both the radial direction 93 and axial direction 92, defining a generally tangent vector at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 91 is a plane that is generally parallel to the axial axis 28.

In the ensuing descriptions, the term "axial" refers to a direction parallel to the centerline of the axial axis 28 and the term "radial" refers to a direction perpendicular to the axial axis 28. An axially inboard (or inward) orientation is an orientation that is axially proximal to the axial midpoint between the two end faces 11a and 11b. Conversely, an axially outboard (or outward) orientation is an orientation that is axially distal to the axial midpoint between the two end faces 11a and 11b. A radially inboard (or inward) orientation is an orientation that is radially proximal to the axial axis 28 and a radially outboard (or outward) orientation is an orientation that is radially distal to the axial axis 28. An axially inboard (or inward) facing surface is a surface that faces toward the axial midpoint between the two end faces 11a and 11b. Conversely, an axially outboard (or outward) facing surface is a surface that faces away from the axial midpoint between the two end faces 11a and 11b.

For general definition purposes herein, an "integral" joinder or assembly is one that is integrated and may not be easily disassembled at the service temperature without damaging at least one of the components that are joined, or is difficult to disassemble, or is otherwise not meant to be disassembled. This integral joinder involves a joining interface directly between two components. This joining interface is often a welded or adhered interface or some other interface where the two joining surfaces are solidly joined to each other to create a unified structure. Preferably this joining interface is a surface interface, rather than a point or edge interface. The integral joinder is in contrast to a fastened joinder, where such a fastened joinder relies solely on a mechanically interlocked engagement to secure or connect the two components to each other. The term "integral" refers to two portions that are unitary, and/or integrally joined. Further, when two portions are considered "monolithic" with each other, they may be considered to be integrally and monolithically combined as a singular element.

Figure 1B:
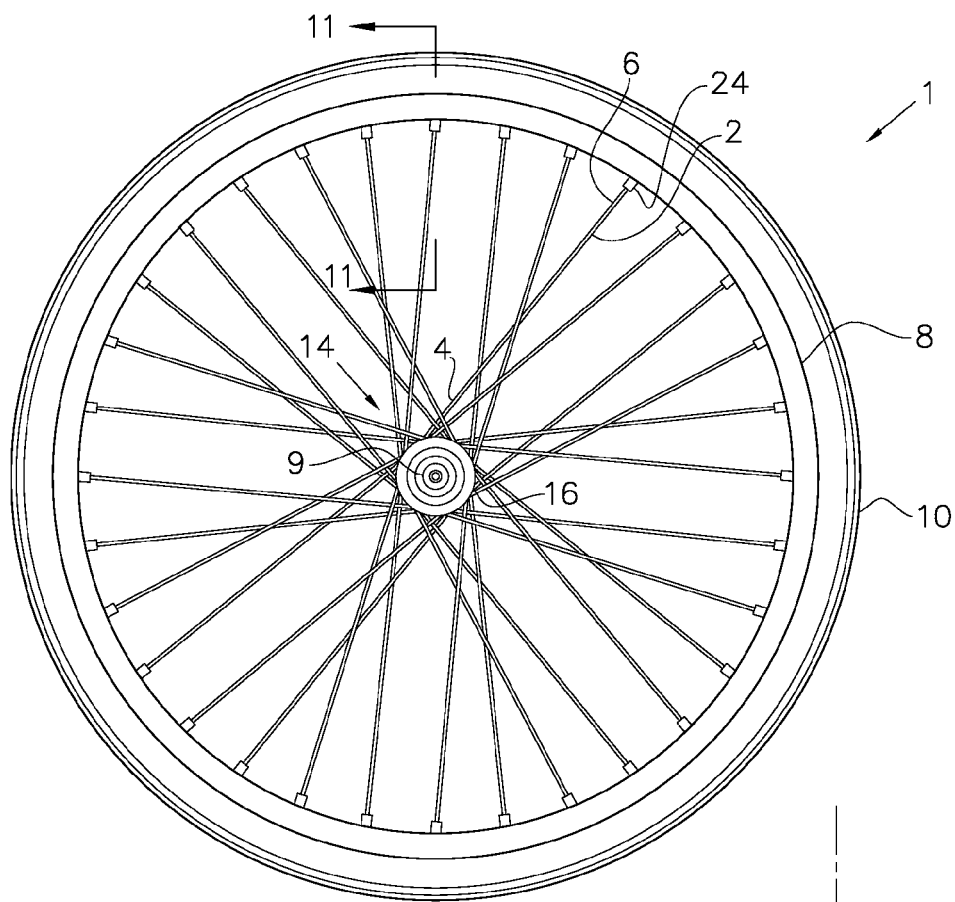
FIG. 1b is a plan view of a prior art conventional bicycle wheel, including a double-wall rim, and spoke nipples.
Figure 1C:
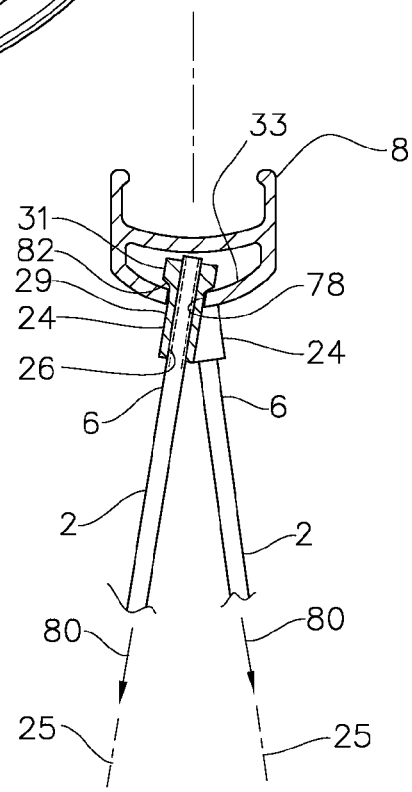
FIG. 1c is a cross-section view of the bicycle wheel of FIG. 1b as seen generally in the direction 11-11 of FIG. 1b.

FIGS. 1b-c describe the current technology in conventional bicycle wheels that most cyclists are familiar with. This prior art design includes a rim 8, a hub shell 14 and a plurality of spokes 2. The hub shell 14 is rotatable about the axle 9 and includes a pair of axially spaced hub flanges 16. The second end 6 of each spoke 2 is then fixed to the rim 8 via spoke nipples 24. Tightening the threaded engagement 26 between the spoke nipple 24 and the spoke 2 serves to effectively shorten the length of the spoke 2. Thus, as the nipples 24 are threadably tightened, the spokes 2 are drawn up tight and a degree of pre-tension is induced in the spoke 2. By selectively adjusting this threaded engagement 26, the spoke pre-tension may be adjusted to align the trueness of the rim 8. The spoke pre-tension is resisted by circumferential compression of the rim 8 and it is this balance of forces that imparts efficient structural integrity to the bicycle wheel 1.

The bicycle wheel 1 includes spokes 2, hub 14, rim 8, and tire 10. The hub 14 includes hub flanges 16 and axle 9. FIG. 1c is a detail of the prior art wheel 1 described in FIG. 1b and shows the rim 8 in cross-section. As shown in FIG. 1c, the rim 8 includes geometry for mounting of a tire 10 and a multiplicity of spoke holes 78 in its spoke bed wall 33, each to accept an individual spoke nipple 24. The spoke nipple 24 includes a shank portion 29, a head portion 31, and a transition surface 82 therebetween. Shank portion 29 is extended through spoke hole 78, with transition surface 82 bearing against the radially outboard surface of the spoke bed wall 33 in an overlie engagement, which provides blocking to resist spoke tension 80. Note that the span of spoke 2 is aligned in the direction of spoke tension 80. Spoke 2 includes a longitudinal axis 25 that is aligned in the direction of spoke tension 80 and extends through the centerline of the spoke 2.

FIG. 2a shows a vehicle wheel, in particular a bicycle wheel assembly 30, including a circumferential outer rim 32, a plurality of spokes 2, a central hub 12, two axially spaced hub flanges 16a and 16b, and two circumferential rim shells 34a and 34b, shown prior to their assembly with the outer rim 32 and with each other. Rim shell 34a includes slots 36a and rim shell 34b include slots 36b. Slots 36a and 36b will provide clearance and passage for the spokes 2 when the rim shells 34a and 34b are assembled to the outer rim 32. Rim shells 34a and 34b are generally circumferential elements that are each separately pre-formed to also include associated corresponding outboard perimeter portions 38a and 38b and radially inboard apex portions 40a and 40b. The spokes 2 are connected to their respective hub flanges 16a and 16b at their first end 4 and extend to connect to the outer rim 32 at their second end 6. It should be noted that rim shells 34a and 34b are generally symmetrical components that are assembled to each other in a back-to-back clamshell arrangement.

As shown here, outer rim 32 and rim shells 34a and 34b are all pre-formed components that have been formed prior to their assembly with the outer rim 32. However, it is also envisioned that one or another of these components may be molded or plastically formed in place to complete this assembly.

Figure 2B:
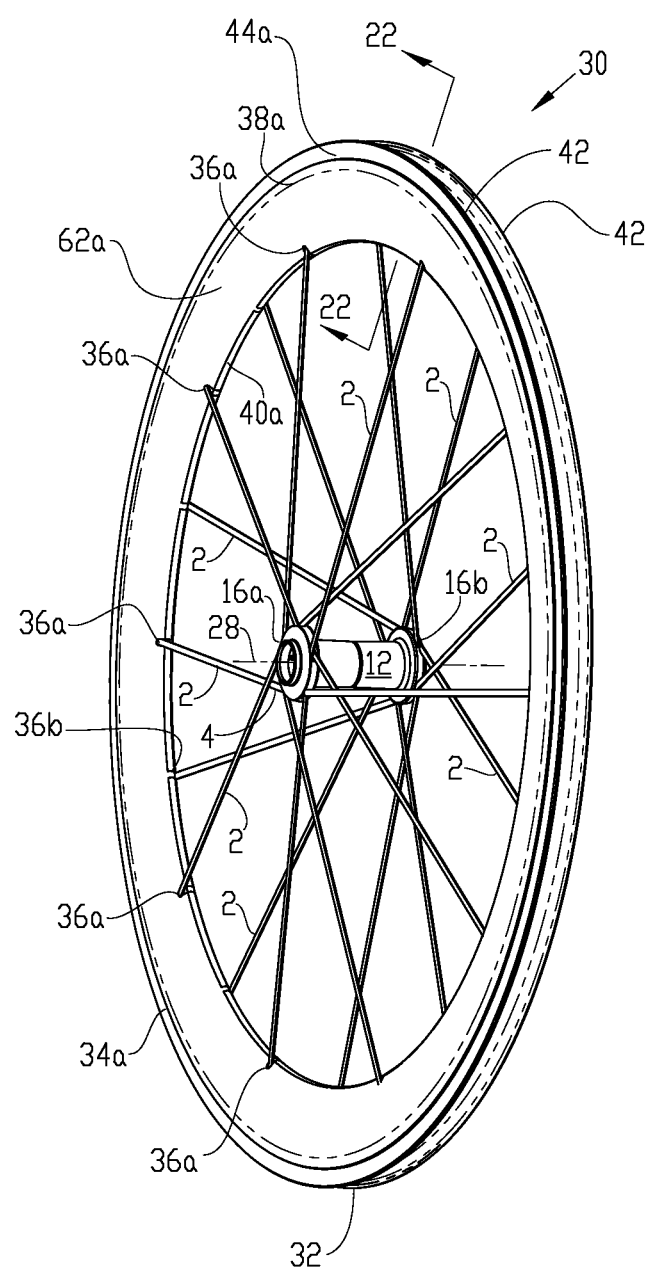
FIG. 2b is a perspective view of the embodiment of FIG. 2a, showing the rim shells assembled to the outer rim.

FIG. 2b shows the bicycle wheel assembly 30 with the rim shells 34a and 34b assembled and joined to each other and to the outer rim 32. Perimeter portion 38a of rim shell 34a is joined to one side of the outer rim 32, while the perimeter portion 38b of rim shell 34b is joined to the axially opposing side of the outer rim 32. Rim shells 34a and 34b are joined to each other at their apex portions 40a and 40b, with spokes 2 extending through respective slots 36a and 36b.

Figure 2C:
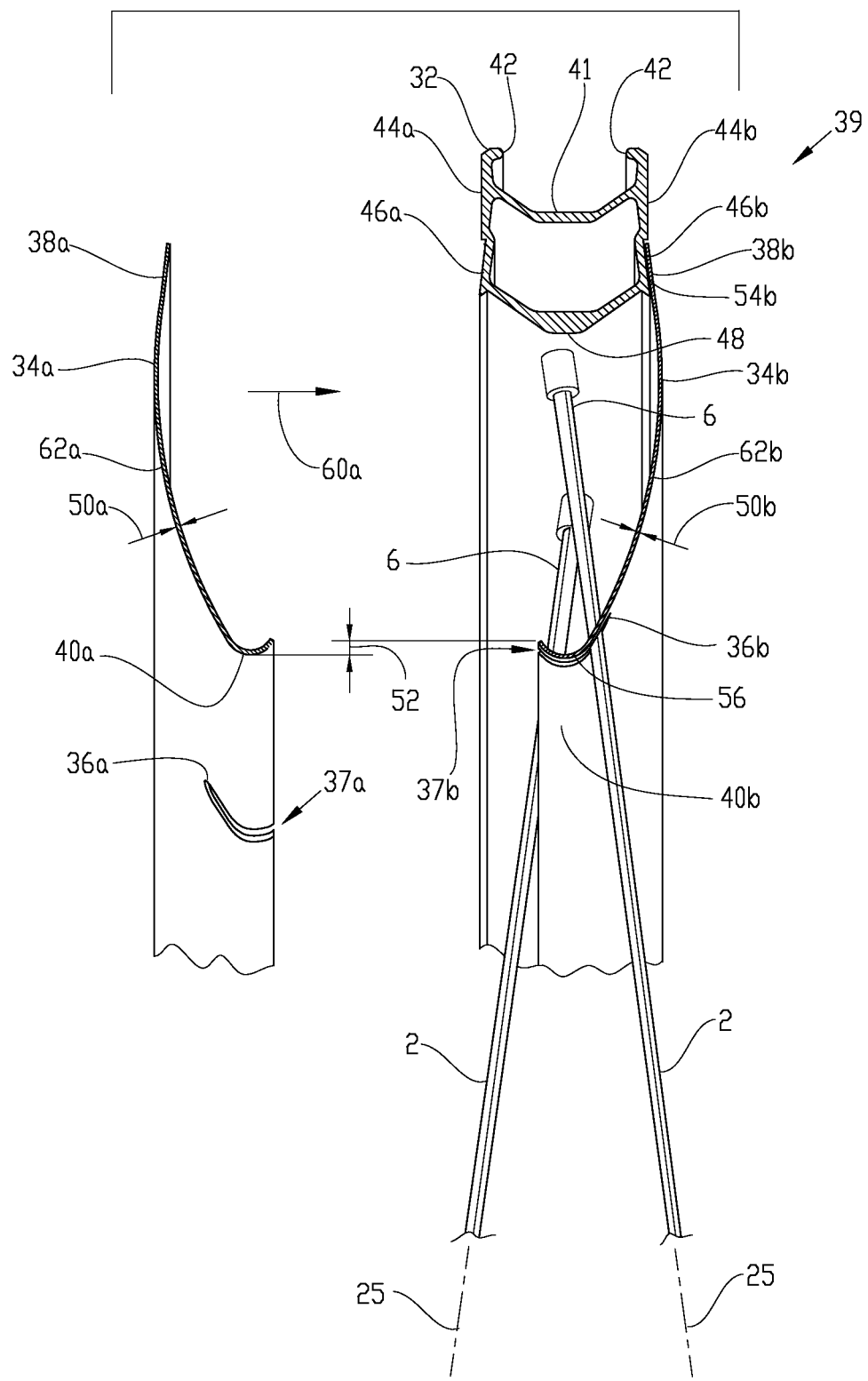
FIG. 2c is a cross-sectional view of the embodiment of FIG. 2b, taken along 22-22, prior to completed assembly of the rim shells, showing one rim shell assembled to the outer rim and another rim shell positioned prior to its assembly with the outer rim.

FIG. 2c shows the transition of assembly between the fully disassembled arrangement of FIG. 2a and the assembled arrangement of FIG. 2b. Outer rim 32 includes tire bed wall 41 and hooks 42 to receive a conventional tire. Outer rim 32 also includes brake track surfaces 44a and 44b and joining surfaces 46a and 46b as well as spoke bed wall 48. Joining surfaces 46a and 46b are shown to be axially offset from their respective adjacent brake track surfaces 44a and 44b. The outer rim 32 shown here is of a relatively conventional arrangement, commonly referred to as "double wall" construction to accept a clincher type tire and rim brakes. It is understood that this geometry is merely representative of a variety of rim types and geometries that may be utilized in the present invention. Rim shell 34a has thickness 50a and includes perimeter portion 38a, sidewall portion 62a, slots 36a, and apex portion 40a. Similarly, rim shell 34b has thickness 50b and includes perimeter portion 38b, sidewall portion 62b, slots 36b, and apex portion 40b.

Thus rim shell 34b is shown to be assembled to outer rim 32 such that perimeter portion 38b is joined to joining surface 46b via a joining means at corresponding outer joining interface 54b. Rim shell 34a is shown prior to its assembly with outer rim 32. It may be seen that slot 36a includes a corresponding open portion 37a and slot 36b includes a corresponding open portion 37b (see FIG. 2a). As rim shell 34a is assembled to outer rim 32 in the generally axial direction 60a, spoke 2 passes through opening 37a and enters slot 36a, which generally surrounds the cross section of the spoke 2. It may be seen that the slots 36a and 36b serve to allow rim shells 34a and 34b to be assembled in the generally axial direction to the outer rim 32 without disrupting the spokes 2.

Figure 2D:
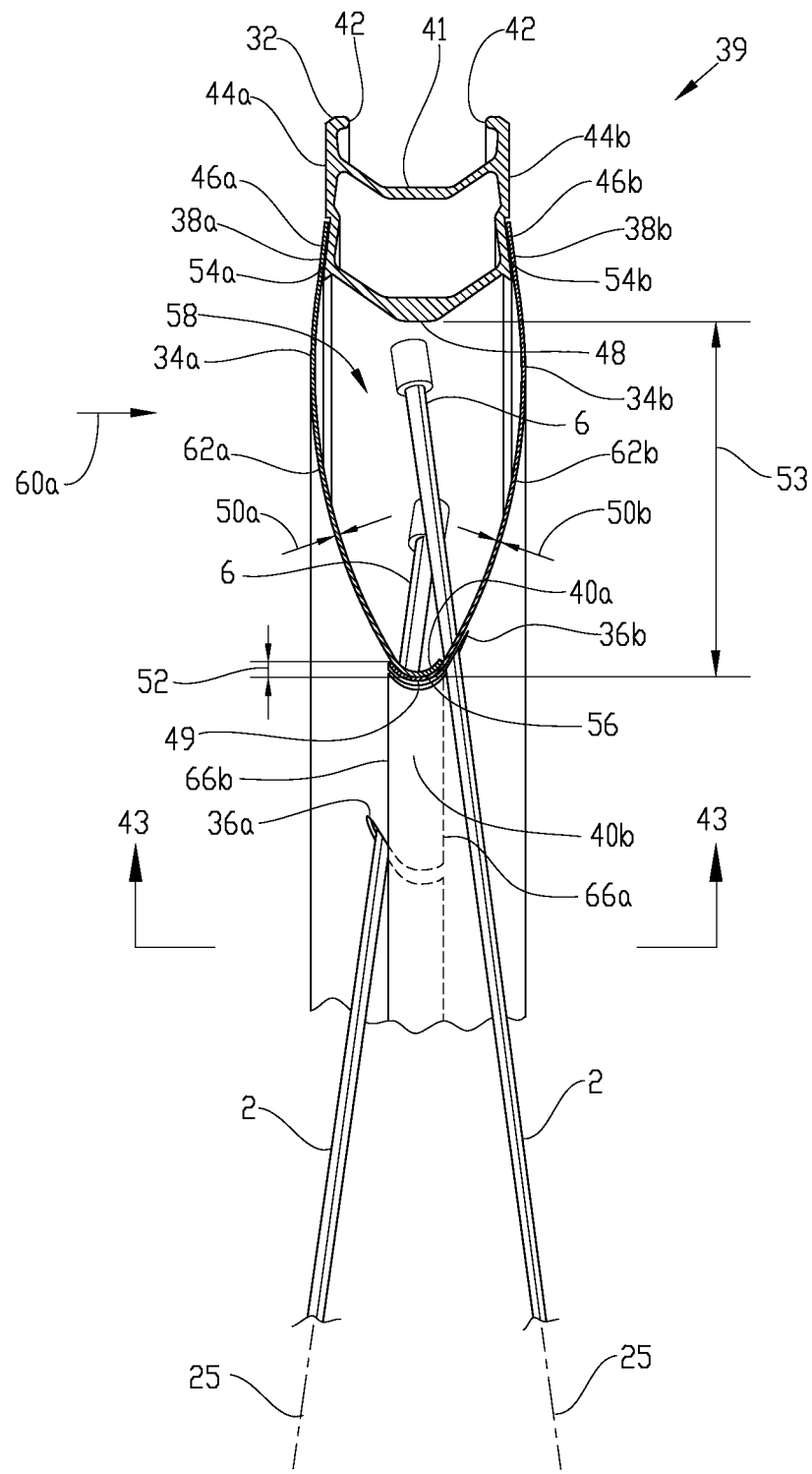
FIG. 2d is a cross-sectional view of the embodiment of FIG. 2b, taken along 22-22.

FIG. 2d shows the assembly of FIG. 2b in greater detail. The joined assembly of the outer rim 32 and the rim shells 34a and 34b serve to create rim assembly 39. Apex portion 40b wraps over apex portion 40a to create a hook or radial overlie 52 for engagement between these nested portions of rim shells 34a and 34b and to create an apex region 49 of the rim assembly 39. Slot 36a is now nested around the cross section of spoke 2 as shown.

Perimeter portions 38a and 38b are joined to their respective joining surfaces 46a and 46b via a joining means at corresponding outer joining interfaces 54a and 54b. This joining means may include adhesive, mechanical fasteners, mechanical interlock and the like. A preferable joining means includes double-stick tape, a type of adhesive tape where the tape includes a carrier with adhesive applied to both sides. It is preferable that the joining interfaces 54a and 54b constitute continuous circumferential interfaces, although interrupted joining interfaces are also envisioned. Joining interfaces 54a and 54b are both shown here in a lap joint configuration where the joining interface occurs between adjacent overlapping surfaces. This joining interface extends in a generally radial direction and thus may be considered a radially overlapping interface. However, a wide variety of alternate joint configurations and geometries are also envisioned, including double-lap joints, butt joints, scarf joints, coverplate joints, etc.

FIG. 2d also shows the external side of apex portion 40a as overlapping and nested within the internal side of apex portion 40b at joining interface or seam 56. Further, apex portion 40a is retained to apex portion 40b by radial overlie 52 to provide a radial interference engagement between the rim shells 34a and 34b as shown. While this radial interference engagement may be sufficient to retain apex portions 40a and 40b together, it is also envisioned that a fastening means may be utilized at the seam 56, such as adhesive and/or mechanical fasteners and the like. Further, apex portions 40a and 40b may also be retained together via a cover plate or adhesive tape that spans the joint between rim shells 34a and 34b in this region. Thus, the joinder of apex portions 40a and 40b may be considered to occur along a generally circumferential seam 56 that is adjacent the interface between the rim shells 34a and 34b and the spokes 2.

As shown in FIG. 2d, a circumferential cavity 58 is created that is bounded by rim shell 34a, rim shell 34b and outer rim 32, with spokes 2 extending within this cavity 58. Since the spokes 2 are structurally connected to the outer rim 32, and not to the rim shells 34a and 34b, the rim shells 34a and 34b are preferably not highly stressed and thus may be of relatively thin material and do not require the robustness to support this connection. The rim shells 34a and 34b may be utilized to provide an aerodynamic shield to the rim/spoke interface concealed within the cavity 58. Further, by effectively increasing the depth of the outer rim 32, the rim shells 34a and 34b may be utilized as a fairing connected to the outer rim 32 to reduce the aerodynamic drag of the overall rim profile. Still further, rim shells 34a and 34b may be utilized to provide some structural reinforcement to the outer rim 32. It is also shown that the outer rim 32 is radially spaced from the seam 56 by radial gap 53.

It should be noted that the seam 56 constitutes a seam or split that is located adjacent the apex region 49 and preferably adjacent the intersection of the spokes 2 and the rim shells 34a and 34b. This joining interface or seam 56 may constitute a permanent joinder between rim shell 34a and 34b (for example, in the case where structural adhesive is inserted within seam 56), where the seam 56 may not be disassembled without damaging at least one of the rim shells 34a and/or 34b. Alternatively, and preferably, the seam 56 may be a removable interface and may be disassembled and reassembled without damage to the rim shells 34a and 34b (for example, in the absence of structural adhesive within seam 56). Among other things, this will allow the wheel to be readily serviced and repaired in the field and will permit access to the second end 6 of the spoke 2 and its juncture with the outer rim 32.

For the purposes of definition used throughout this disclosure, the spoke bed 48 may be considered as the portion of the outer rim 32 to which the outer portions 6 of the spokes 2 are structurally connected. Further, the outer rim 32 may be considered as the portion of the rim assembly 39 that includes the spoke bed 48. The tire bed 41 may be considered as the radially outwardly facing portion of the outer rim 32 that supports a tire and/or inner tube. The combination rim shell 34a and 34b may be considered as the portion of the rim assembly 39 that extends generally radially inwardly from the spoke bed 41. The apex region 49 may be considered as the region adjacent the radially inboard inflection of the rim assembly 39. The apex portions 40a and 40b of the corresponding rim shells 34a and 34b are the portion of these rim shells 34a, 34b that are generally adjacent the apex region 49. While the various embodiments of the present invention show rim shells 34a and 34b to each have a single associated circumferential apex portion 40a and 40b, it is also envisioned that a rim assembly 39 may alternatively include a multiplicity of axially or circumferentially spaced apex portions.

It is shown here that slots 36a and 36b provide clearance for spokes 2 to pass through the respective rim shells 34a and 34b. While a hole, rather than a slot 36a and/or 36b, may alternatively be provided for this purpose, the slot configuration is preferred. With the spokes 2 pre-assembled to the outer rim 32 (as shown in FIG. 2a), these slots 36a and 36b permit the rim shells 34a and 34b to be assembled axially toward each other, with the spoke introduced through the open end of the slot, as detailed in FIGS. 2d-f. When the apex portions 40a and 40b are assembled together, the slots 36a and 36b are closed to surround the cross section of the corresponding spokes The slots also permit axial disassembly of the rim shells 34a and 34b as well. Alternatively, it is envisioned that rim shells 34a and 34b may include holes instead of slots 36a and 36b. However, the substitution of a hole instead of a slot results in the rim shell surrounding the cross section of the spoke 2. Thus, for assembly and/or removal of a spoke or rim shell, the hole requires that the spoke 2 be completely disassembled from the outer rim 32 and then threaded along its longitudinal axis 25 through the hole, a far more cumbersome process than the procedure described in FIGS. 2a-h. It is noted that there is a clearance between spokes 2 and their respective openings provided by slots 36a and 36b. As such, there is no significant structural tensile joinder between the spokes 2 and rim shells 34a and 34b at apex portions 40a and 40b.

It should be noted that the configuration shown here shows a conventional staggered spoke 2 lacing, with the spoke connections circumferentially spaced at the outer rim 32 and alternately extending to one of two axially spaced hub flanges 16a and 16b as illustrated in FIGS. 2a-b. This staggered lacing means that the spokes 2 pass through the rim shells 34a and 34b at axially staggered locations. As shown in FIG. 2d, it may be seen that the apex portion 40b of rim shell 34b may be utilized to partially cover slot 36a of rim shell 34a, thereby leaving only a small opening portion of the slot 36a exposed for passage of the spoke 2. Similarly, apex portion 40a of rim shell 34ab may be utilized to partially cover slot 36b of rim shell 34b, thereby leaving only a small opening portion of the slot 36b exposed for passage of the spoke 2. It is generally advantageous to maintain a close fit between the slots 36a and 36b and the respective spokes 2 as this minimizes aerodynamic drag at this interface and maintains a clean aesthetic appearance. As such it may be advantageous that the edges 66a and/or 66b and the seam 56 are closely surrounding the spoke 2.

It is shown here that rim shells 34a and 34b have a generally constant cross-section thickness 50a and 50b respectively. This may be preferable and also allows the rim shells 34a and 34b to be economically formed from sheet material by a wide range of forming processes, including vacuum forming and/or pressure forming methods that are well known in industry. The starting sheet material is commonly flat and is of generally constant thickness. Alternatively, rim shells 34a and 34b may be molded or otherwise formed to have a non-constant or variable wall thickness and may include a wide variety of geometrical features to enhance their appearance, function and/or assembly. For example, rim shells 34a and/or 34b may include ridges, bumps, bosses or other types of raised or relieved geometry that will facilitate the proper fitment or engagement between the two rim shells 34a and 34b. Also, a wide range of materials and fabrication and/or forming techniques may be utilized in their manufacture.

FIGS. 2e-h describe the embodiment of FIGS. 2a-d in greater detail and show a representative assembly sequence of the rim shells 34a and 34b and the outer rim 32. FIG. 2e corresponds to FIG. 2a and shows the rim shells 34a and 34b prior to their assembly with the outer rim 32. Rim shell 34a includes circumferentially extending edge 66a, external apex surface 68a, and internal apex surface 69a. Similarly, rim shell 34b includes circumferentially extending edge 66b, external apex surface 68b, and internal apex surface 69b. Internal apex surfaces 69a and 69b may be considered to be circumferential concave surfaces with their concave openings facing generally radially outwardly and external apex surfaces 68a and 68b may be considered to be circumferential convex surfaces, with their convex apex pointed generally radially inwardly. Double-stick tape 70a and 70b extends circumferentially to provide an adhesive joinder between the respective joining surfaces 46a and 46b and perimeter portions 38a and 38b, and are shown here as a representative means to join the rim shells 34a and 34b to the outer rim 32.

Next, the rim shells 34a and 34b are assembled to the outer rim 32 in their respective directions 60a and 60b such that respective perimeter portions 38a and 38b are joined to their corresponding joining surfaces 46a and 46b, as shown in FIG. 2f. Perimeter portions 38a and 38b are adhered to joining surface 46a and 46b respectively by means of double-stick tape 70a and 70b respectively. At this step, edges 66a and 66b are axially butted against each other as shown and apex portions 40a and 40b are not yet overlapping. Sidewall portions 62a and 62b are shown here to be generally flexible and elastically flex to temporarily distort to permit this initially assembled orientation described in FIG. 2f. With the perimeter portions 38a and 38b joined to the outer rim 32, the apex portions 40a and 40b may then be manually pressed toward each other in respective directions 64a and 64b such that the rim shells 34a and 34b elastically flex to further accommodate overlie 52 and allow edge 66b to slip over external apex surface 68a in direction 64b until apex portion 40a is overlapped with apex portion 40b and convex external apex surface 68a is contacting and nested with concave internal apex surface 69b as shown in FIG. 2g. Since the rim shells 34a and 34b have not been significantly yielded during this assembly procedure, their stiffness causes external apex surface 68a to radially press against internal apex surface 69b and maintain their nested configuration and to retain the two components to each other and resist inadvertent disassembly. Such an overlie assembly is commonly termed a "snap-fit". In this case, the overlie 52 is a generally radial overlie, however other designs may include an axial or circumferential overlie as a means to connect the rim shells 34a and 34b to each other and/or to the outer rim 32.

The interface between external apex surface 68a and internal apex surface 69b constitutes an overlapping seam 56. The seam 56 includes an exterior seam periphery 57 adjacent edge 66b and an interior seam periphery 59 adjacent edge 66a. Adhesive and/or mechanical fasteners may be utilized within and/or adjacent this seam 56 to augment the snap-fit connection between apex portions 40a and 40b. For example, as shown in FIG. 2h, adhesive tape 76 is next applied to adhere to both apex portion 40a and 40b and to span across exterior seam periphery 57 to serve as an intermediate element to bind rim shell 62a to rim shell 62b in the apex region 49. As such, adhesive tape 76 may be considered as a span element, discreet from rim shells 62a and 62b, that serves to connect or bind apex portions 40a and 40b to each other. Adhesive tape 76 commonly consists of a substrate or carrier with adhesive applied to at least one surface. Double-stick tape consists of a substrate or carrier with adhesive applied to both surfaces.

It is shown in FIGS. 2g and 2h that a hollow rim assembly 39 is created to include cavity 58 that is bounded by outer rim 32, rim shell 34a and rim shell 34b. Cavity 58 includes a radial gap 53 between spoke bed wall 48 and internal apex surface 69b as show in FIGS. 2d and 2h. As shown in FIG. 2d, spokes 2 are structurally anchored and terminated at the spoke bed wall 48 of the outer rim 32 at their second ends 6. However, these spokes 2 may also merely span to extend through slots 36a and 36b and may have little or no structural connection to the rim shells 34a and 34b. Thus, while the apex region 49 may define the radially inboard periphery of the rim assembly 39, the spokes 2 extend within cavity 58 and across gap 53 and are structurally anchored to the radially outboard spoke bed wall 48. This arrangement is in contrast to the vast majority of conventional bicycle rims where the structural spoke bed wall also defines the radially inward periphery of the rim. As such, the present invention belongs to a unique category of rim construction that includes two laterally extending walls with a gap 53 therebetween: (i) a radially inboard apex portion 49 and (ii) a structural spoke bed portion 48 radially outboard of the apex portion 49.

It should be noted that this embodiment describes an elastic snap-fit between apex portions 40a and 40b. This means that the rim shells 34a and 34b are flexed or deformed to a stress within the elastic range of the material. Alternatively, rim shells 34a and 34b and/or outer rim 32 may be plastically deformed and yielded to engage the other. For example, the apex portion 40b may be crimped to capture and engage apex portion 40a.

FIG. 2i shows how mechanical fasteners, such as rivets 74a and 74b, may be utilized to create or augment the connection between the rim shells 34a and 34b and the outer rim 32. Rivets 74a and 74b are representative of a wide range of mechanical fasteners that may be utilized to mechanically lock the perimeter portions 38a and 38b to their respective joining surfaces 46a and 46b of the outer rim 32. Similarly, a wide range of alternate mechanical fasteners, such as screws and the like, may be utilized to create or augment the connection between apex portion 40a and apex portion 40b.

FIG. 2j corresponds to FIG. 2d in most respects. However, spoke 2 includes an enlarged portion 72 adjacent its second end 6 and a mid-portion 7 of reduced cross section. It is noted that this enlarged portion 72 is too large in cross-section to pass through its respective slot 36a or 36b. If enlarged portion 72 were to be assembled along its longitudinal axis 25 through this slot 36a or 36b, this slot 36a or 36b would need to be oversized to allow passage of the enlarged portion 72. In such a case, with mid-portion 7 positioned in respective slot 36a or 36b during final assembly, this slot 36a or 36b would necessarily then have excessive clearance with the mid-portion 7. Similarly, if holes were substituted for slots 36a and 36b, then these holes would need to be oversized to permit passage of the enlarged portions 72, thus leaving excessive clearance between the holes and their respective mid portions 7. This excessive clearance would reduce aerodynamic efficiency and aesthetics. However, since the rim shells 34a and 34b may be assembled around the spokes 2 in a generally axial direction as described in FIGS. 2e-h, the slots 36a and 36b are assembled to interface only with the mid-portion 7 and thus slots 36a and 36b may be sized for close fitment with the mid-portion 7. Thus, FIG. 2j illustrates a significant benefit of the present invention, which permits the enlarged portion 72 to be aerodynamically shielded and enclosed within cavity 58, while slot 36 has a close fit with the spoke 2.

While the embodiment of FIGS. 2a-j shows two discreet preformed rim shells 34a and 34b, FIG. 3a describes an embodiment where the rim assembly 101 includes a singular one-piece rim shell 100. Outer rim 102 is similar to that described in FIGS. 2a-g, however it includes a generally radially inboard-facing joining surface 104. Rim shell 100 includes outboard portion 110, sidewall portions 106a and 106b, and corresponding apex portions 108a and 108b. At their radially outboard periphery, sidewall portions 106a and 106b are integral with the outboard portion 110, which is joined to the joining surface 104 of the outer rim 102 at a joining interface 112, preferably via adhesive or a fastening means as previously described. Outboard portion 110 overlaps joining surface 104 in an axially overlapping joining interface. Adhesive or fasteners or other joining means may be utilized at the joining interface to fortify the joinder between the rim shell 100 and the outer rim 102. Rim shell 100 may alternatively be retained to the outer rim via mating interference and/or retaining geometry. Thus rim shell 100 is joined to the outer rim 102 via an overlapping joinder. Rim shell 100 is also shown to enclose cavity 116.

The geometry of apex portions 108a and 108b are similar to the corresponding apex portions 40a and 40b of FIGS. 2a-g. Apex portion 108a may be snap-fit to apex portion 108b by pressing in the corresponding apex portions 108a and 108b against each other in corresponding directions 114a and 114b in the manner previously described in FIGS. 2a-i. Apex portions 108a and 108b interface with the spokes 2 in a manner described in FIGS. 2a-i.

FIGS. 3b-c describe an embodiment where the rim shell elements 200a and 200b have an overlie engagement with the outer rim 202 and, as shown, may be snap-fit with the outer rim 202. As shown in FIG. 3b, outer rim 202 includes a tire bed wall 216 and a spoke bed wall 218, with radial inboard extensions 212a and 212b adjacent their corresponding radial outboard recesses 214a and 214b. Rim shells 200a and 200b include corresponding sidewall portions 204a and 204b and perimeter portions 206a and 206b. Rim shells 200a and 200b also include corresponding radially outboard apex portions 210a and 210b and radially inboard apex portions 208a and 208b, with edges 209a and 209b.

As shown in FIG. 3b, rim shell 200a is engaged to the outer rim 202, with outboard apex 210a engaged and nested with recess 214a. Outboard apex 210a has a radial overlie distance 220a with the extension 212a and the spoke bed wall 218. Thus, outboard apex 210a is shown to be captured and engaged to recess 214a, thereby engaging rim shell 200a to outer rim 202. Rim shell 200b is shown prior to its assembly with outer rim 202 and rim shell 200a. It may be seen that outboard apex 210b has a radial overlie distance 220b with respect to the extension 212b and also with the spoke bed wall 218.

As rim shell 200b is assembled to the outer rim 202 in direction 222, outboard apex 210b is pressed against extension 212b, forcing the outboard apex 210b to flex radially inward to clear past the extension 212b. With further assembly in direction 222, outboard apex 210b becomes axially aligned with recess 214b, permitting the outboard apex 210b to elastically spring back to its un-flexed position, with the outboard apex 210b nested and retained within recess 214b. Thus, it may be seen that outboard apex 210b has a radially overlying snap-fit engagement with the outer rim 202.

As also previously described in FIGS. 2f-g, apex portion 208b is pressed toward apex portion 208a in direction 222 such that the rim shells 200a and 200b flex slightly to allow apex portion 208b to snap over and nest with apex portion 208a as shown in FIG. 3c. It is shown that there is a radial overlie distance 224 between the edge 209b and inboard apex 208a. When edge 209b is pushed toward apex portion 208a, rim shells 200a and 200b flex slightly, permitting edge 209b to push axially past apex portion 208a and then flex back such that apex portion 208a is now nested and retained within apex portion 208b, as shown in FIG. 3c. Thus, it may be seen that apex portion 208b has a radially overlying snap-fit engagement with apex portion 208a. A rim assembly 201 is thus created to include a hollow rim cavity 226 that is bounded by outer rim 202, rim shell 200a and rim shell 200b.

It is noted that the embodiment of FIGS. 3b-c describe snap-fit connections between outboard apexes 210a and 210b with the outer rim 202 as well as snap-fit connections between apex portions 208a and 208b. While these snap-fit connections provide easy assembly and disassembly without damaging the components involved, it is also envisioned that a more robust connection may be achieved through a more positive overlying connection that may be difficult to disassemble without damaging the components. Further, the components may be assembled to each other through a variety of overlying engagement means outside of a snap-fit. For example, the continuous circumferential outer rim 202 hoop may first be split into a "C" shape with a radial seam at two rim ends. These rim ends may be temporarily spread to create a gap between its two ends to permit circumferential expansion of the rim hoop. The ends of the outer rim 202 are then re-joined to capture the rim shells 200a and 200b. A wide range of alternate connection configurations are envisioned that utilize an overlie engagement to connect the rim shells to each other or to the outer rim 202. Further, the overlie engagement may be augmented with adhesive or fasteners or other joining means.

The embodiment of FIG. 3d provides a representative description of alternate joint configurations involved in joining rim shell(s) to each other and/or to an outer rim. Outer rim 118 is similar to outer rim 102 of FIG. 3a and includes spoke bed 123 and joining surface 119. Rim shells 120a and 120b include corresponding collars 126a and 126b, sidewalls 130a and 130b, and apex portions 122a and 122b respectively. Collars 126a and 126b are joined to joining surface 119 at overlapping joining interfaces 121a and 121b respectively in a manner previously described. Since the joining interfaces 121a and 121b extend in a generally axial direction, they may be considered as axially overlapping interfaces. The joining interfaces 121a and 121b may constitute a permanent joinder between rim shells 120a and 120b, where the joining interfaces 121a and 121b may not be disassembled without damaging at least one of the rim shells and/or the outer rim. Alternatively, the joining interfaces 121a and 121b may a removable interfaces and may be disassembled and reassembled without damage to the rim shells and/or the outer rim.

Apex portions 122a and 122b include joining surfaces 124a and 124b that extend in a generally radial direction and are joined to each other at joining interface 128. If desired, the joining interface 128, which is commonly considered a "butt joint" type of arrangement, may include adhesive and/or fasteners to span between apex portions 122a and 122b and to augment this joinder. Alternatively, no adhesive may be necessary and joining surfaces 124a and 124b may simply be near each other or otherwise contacting and pressed against each other via preload provided by the stiffness of the rim shells 120a and 120b. As a further alternative, joining surfaces 124a and 124b may be separated by a slight gap (not shown) and apex portions 122a and 122b would not be directly joined to each other at all.

While the embodiment of FIGS. 2a-j describe rim shells of relatively constant wall thickness 50a and 50b, FIG. 3d shows that the thickness 132 of the sidewalls 130a and 130b of rim shells 120a and 120b to be thinner than the thickness 134 of apex portions 122a and 122b. In this example, the thicker wall thickness 134 provides a larger surface area at the joining interface 128. Variable wall thickness may also allow the geometry and stiffness of the rim shell to be more specifically tailored to the desired function and/or aesthetics of the rim shell elements.

The embodiment of FIG. 3e provides a representative description of an alternate means of joining rim shell(s) to each other and/or to an outer rim. Outer rim 118 is includes spoke bed 113 and joining surface 119. Rim shells 140a and 140b include corresponding axially-extending collars 141a and 141b, sidewalls 142a and 142b, and apex portions 144a and 144b respectively. Collar 141b is joined to joining surface 119 at an axial overlapping joining interface 146, whereas collar 141a is joined to the inboard surface of flange 141b at joining interface 148 in an axially-extending overlap arrangement as previously described.

Apex portions 144a and 144b include joining collars 150a and 150b respectively that extend in a generally axial direction and are joined to each other at joining interface 152. If desired, the joining interface 152, which is commonly considered a "lap joint" type of arrangement, may include adhesive and/or fasteners to span between apex portions 144a and 144b and to augment this joinder. Alternatively, no adhesive may be necessary and joining flanges 150a and 150b may simply overlap each other.

Figure 4A:
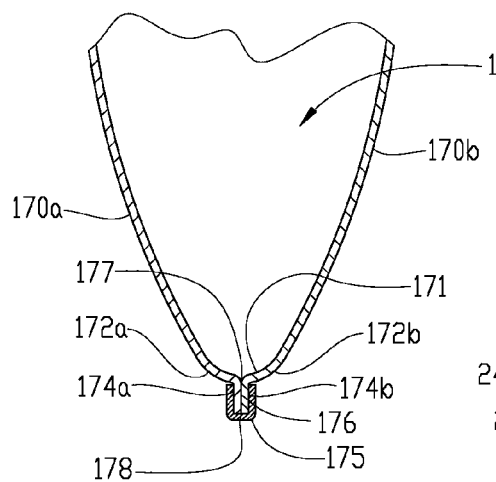
FIGS. 4a-k are partial cross-sectional views, similar to the view of FIG. 2d, detailing a range of alternate apex portion geometries and joining interfaces, including various spanning elements to retain the two apex portions to each other.

FIGS. 4a-j provide additional representative geometry descriptions of alternate joinder geometry between mating rim shell(s) at their respective apex portions. FIG. 4a shows two opposing rim shells 170a and 170b with corresponding apex portions 172a and 172b respectively and radially inwardly extending flanges 174a and 174b respectively. Flanges 174a and 174b meet each other at a seam 176 as shown, with an interior seam periphery 177 adjacent the internal cavity 173 and an exterior seam periphery 178 adjacent the exposed exterior of the rim shells 170a and 170b. Seam 175 has a generally radially overlapping interface between flanges 174a and 174b. If desired, adhesive may be inserted within seam 176 to bond apex portions 172a and 172b directly to each other. U-shaped binder 175 is an auxiliary element that is installed to externally wrap around the flanges 174a and 174b and to span across the exterior seam periphery 178. As such, the U-shaped binder 175 serves as a span element to bind apex portions 172a and 172b to each other. The U-shaped binder 175 may be representative of a circumferentially extending piece of adhesive tape that is circumferentially wrapped around and adhered to the flanges 174a and 174b as shown. Alternatively, the U-shaped binder 175 may be representative of a channel of U-shaped cross sectional profile that is wrapped around flanges 174a and 174b as shown. Such This U-shaped profile has sufficient rigidity to bind the flanges 174a and 174b to each other. As a further alternative, the U-shaped binder 175 may be representative of a joining clip of U-shaped cross sectional profile that is wrapped around flanges 174a and 174b as shown, but is circumferentially discontinuous. This U-shaped joining clip preferably has sufficient rigidity and strength to bind the flanges 174a and 174b to each other. Several joining clips may be assembled to flanges 174a and 174b at circumferentially spaced locations.

Further, if desired, adhesive and/or fasteners may be utilized in apex portions 172a and 172b or within the seam 176 to span between apex portions 172a and 172b and to further bind flanges and 174a and 174b together. Thus, rim shells 170a and 170b are joined to each other at the radially extending seam where they meet in apex region 171 and seam 176 may be considered a radial seam.

Figure 4B:
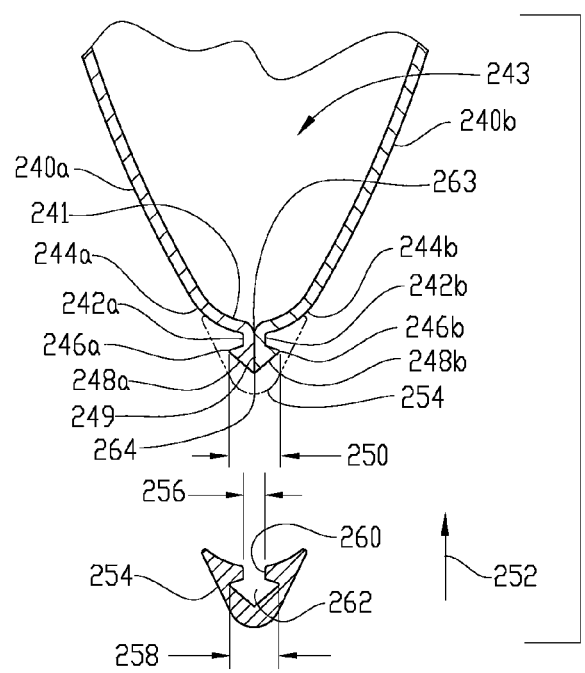

FIG. 4b shows two opposing rim shells 240a and 240b, including corresponding apex portions 244a and 244b. Apex portions 244a and 244b incorporate geometry for mating with coupling cap 254, including axial recesses 242a and 242b, axial ridges 246a and 246b, and ramped surfaces 248a and 248b respectively. Rim shells 240a and 240b meet each other at seam 249, including interior seam periphery 263 adjacent internal cavity 243 and exterior seam periphery 264 adjacent the exposed exterior of rim shells 240a and 240b. Seam 249 has a generally radially overlapping interface between rim shells 240a and 240b. Axial ridges 246a and 246b extend axially outwardly from axial recesses 242a and 242b and are separated by distance 250. Coupling cap 254 is made of somewhat flexible material and includes a necked region 260 of narrower axial width 256 and enlarged region 262 of wider axial width 258.

As the coupling cap 254 is assembled to the apex portions 244a and 244b in the generally radial outboard direction 252 as shown, necked region 260 is pressed against ramped surfaces 248a and 248b. Further assembly in direction 252, serves to wedge and elastically flex the coupling cap 254, causing the necked region 260 to spread wider, allowing it to pass past axial ridges 246a and 246b. The coupling cap 254 may now spring back to its original shape, with the necked region nested within the axial recesses 242a and 242b and axial ridges 246a and 246b located within enlarged region 262. Thus, the coupling cap 254 serves as a snap-fit joining clip to retain the apex portions 244a and 244b to each other, a fastening means well known in industry. It should be noted that there is a generally axial overlie between the narrower axial width 256 of the coupling cap and the wider axial distance 250 between axial ridges 246a and 246b, which serves to retain the coupling cap 254 to the rim shells 240a and 240b. Coupling cap 254 has a radially extending overlie engagement with both apex portions 244a and 244b to axially bind apex portions 244a and 244b together. Coupling cap 254 is an auxiliary element that is installed to externally span across the exterior seam periphery 264. As such, the coupling cap 254 serves as a span element to bind apex portions 244a and 244b to each other. The coupling cap 254 may be configured as a circumferential channel of the cross section profile shown that extends circumferentially around the entire radially inboard periphery of the apex region 241 as shown. Alternatively, the coupling cap 254 may constitute one of a series of individual clips of the profile shown that are arranged at discreet circumferential locations around the radially inboard periphery of the apex region 241.

Figure 4C:
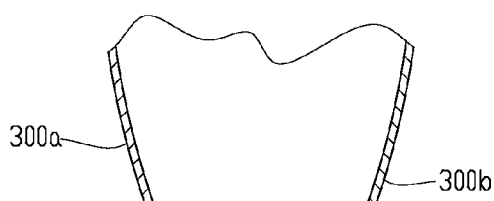

FIG. 4c shows two opposing rim shells 300a and 300b with corresponding apex portions 302a and 302b respectively. Apex portion 302a includes radially inwardly extending flange 304. Apex portion 302a includes a U-shaped flange 305 with a radially inwardly extending flange portion 308 and a radially outwardly extending flare portion 309 and a radially inwardly extending opening 307 therebetween. Flange 304 meets flange portion 308 at a radially overlapping seam 310. Rim shells 300a and 300b are assembled to each other such that flange 304 extends radially inwardly within opening 307, with the flange 304 axially straddled and captured between flange portion 308 and flare portion 309. Thus, the U-shaped flange 305 wraps around the flange 304 to span across the seam 310 between flange 304 and flange portion 308. Flare portion 309 provides a radially extending overlie engagement with flange 304 to axially retain rim shell 300a to 300b. As such, the arrangement of FIG. 4c is similar to the arrangement of FIG. 4a, however, FIG. 4a shows the U-shaped binder 175 as a separate element from rim shell 170b, while FIG. 4c shows the U-shaped flange 305 as being integral and monolithic with rim shell 300b. U-shaped flange 305 is integral with apex portion 302b to externally span across the exterior periphery 306 of seam 310. As such, U-shaped flange 305 serves as a span element to bind apex portions 300a and 300b to each other.

Flare portion 309 may be formed prior to assembly between apex portions 302a and 302b. Alternatively, apex portions 302a and 302b may be first assembled together and flange 304 may be subsequently plastically flared and/or crimped to form flare portion 309 and to capture flange 304. U-shaped flange 305 serves to bind apex portions 302a and 302b to each other. The U-shaped flange 305 may be representative of a circumferentially extending U-shaped flange profile for a continuous circumferential engagement with flange 304. Alternatively, the flare portion 309 may be representative of a series of circumferentially spaced tabs that extend radially outwardly to capture the flange 304.

Figure 4D:
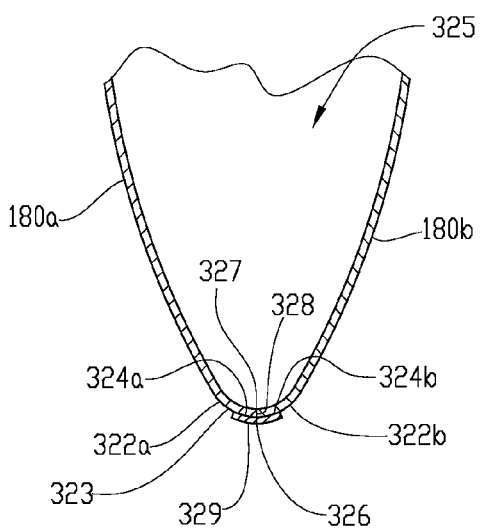

FIG. 4d describes an embodiment similar to that of FIG. 3d. Rim shells 320a and 320b include respective apex portions 322a and 322b and respective joining surfaces 324a and 324b that extend in a generally radial direction and are joined to each other at a seam 328, which includes an interior seam periphery 327 adjacent internal cavity 325 and an exterior seam periphery 326 adjacent the exterior of rim shells 320a and 320b. Seam 328 is commonly considered a "butt joint" type of arrangement and may include adhesive and/or fasteners to span between apex portions 322a and 322b to augment this joinder. Alternatively, no adhesive may be necessary and joining surfaces 324a and 324b may simply be near each other or otherwise pressed against each other via preload provided by the stiffness of the rim shells 320a and 320b. Adhesive tape 329 a is next applied as shown, to adhere to both apex portion 322a and 322b and to span across exterior seam periphery 326 to serve as an intermediate span element to retain and bind rim shell 320a to rim shell 320b in the apex region 323.

Figure 4E:
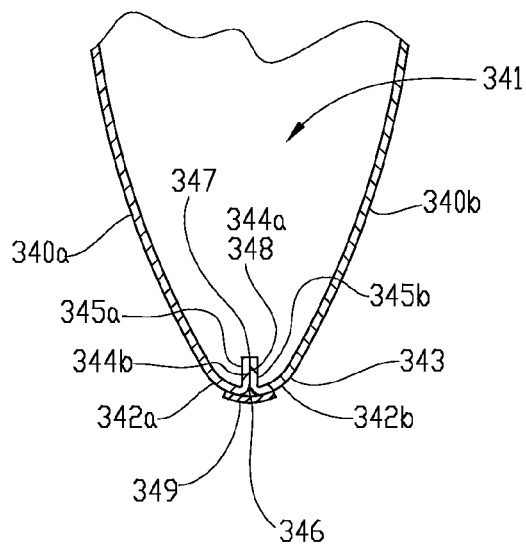

FIG. 4e describes an embodiment similar to that of FIG. 4d. However, FIG. 4e shows rim shells 340a and 340b, which include respective apex portions 342a and 342b and respective flared flanges 345a and 345b with respective joining surfaces 344a and 344b that extend in a generally radially outwardly direction and are joined to each other at a radially overlapping seam 348, which includes an interior seam periphery 347 adjacent internal cavity 341 and an exterior seam periphery 346 adjacent the exposed exterior of rim shells 340a and 340b. Seam 328 may include adhesive and/or fasteners to span between apex portions 342a and 342b to augment this joinder. Alternatively, no adhesive may be necessary and joining surfaces 344a and 344b may simply be near each other or otherwise pressed against each other via preload provided by the stiffness of the rim shells 340a and 340b. Adhesive tape 349 a is next applied as shown to adhere to both apex portion 342a and 342b and to span across exterior seam periphery 346 to serve as an intermediate span element to retain and bind rim shell 340a to rim shell 340b in the apex region 343.

Figure 4F:
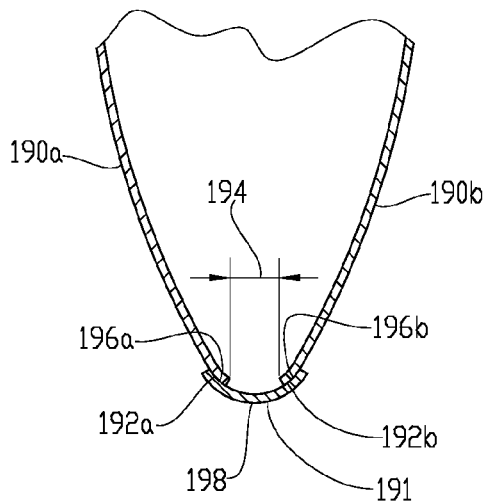

FIG. 4f shows two opposing rim shells 190a and 190b with corresponding apex portions 192a and 192b. It may be seen that apex portions 192a and 192b do not actually meet each other. Instead there exists a gap 194 between apex portions 192a and 192b at apex region 191. Gap 194 may be considered an open seam between apex portions 192a and 192b. Cover plate 198 may be considered to be an intermediate connecting element that spans between rim shells 190a and 190b to bridge the gap 194. Cover plate 198 is joined to apex portion 192a at joining interface 196a and to apex portion 192b at joining interface 196b. Joining interfaces 196a and 196b have an overlapping lap-joint configuration. Cover plate 198 serves as an intermediate span element that spans and connects apex portions 192a and 192b. It is noted that cover plate 198 may alternatively be considered as an extension of rim shell 190a that overlaps apex portion 192b and/or as an extension of rim shell 190b that overlaps apex portion 192a. Cover plate 198 may be made of flexible adhesive tape or it may be a more rigid element. Adhesive and/or fasteners may alternatively be utilized at joining interfaces 196a and 196b to join cover plate 198 to rim shells 190a and 190b. Thus, rim shells 190a and 190b are joined to each other at the open seam where they meet in apex region 191.

Figure 4G:
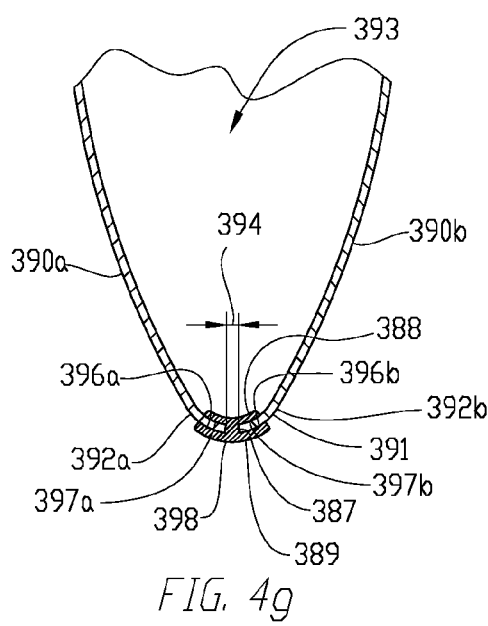

FIG. 4g has some similarity to FIG. 4f. FIG. 4g shows two opposing rim shells 390a and 390b with corresponding apex portions 392a and 392b. It may be seen that apex portions 392a and 392b do not actually meet each other. Instead there exists a gap 394 or open seam between apex portions 392a and 392b at apex region 391. I-channel 398 includes an interior cover plate 388 and an exterior cover plate 389 with a radially extending web 387 extending within gap 394 between the general midpoints of interior cover plate 388 and exterior cover plate 389. Exterior cover plate 389 spans across the gap 394 and functions similarly to cover plate 198 of FIG. 4d and is joined to apex portion 392a at joining interface 396a and to apex portion 392b at joining interface 396b. Similarly, interior cover plate 388 also spans across gap 394 and is joined to apex portion 392a at joining interface 397a and to apex portion 392b at joining interface 397b. Interior cover plate 388 is also adjacent the internal cavity 393. Web 387 extends within gap 394. I-channel 398 may be considered to be an intermediate connecting element that spans between rim shells 390a and 390b to bridge the gap 394 and is joined to apex portion 392a at joining interfaces 396a and 397a and to apex portion 392b at joining interfaces 396b and 397b. Joining interfaces 196a, 196b, 197a, and 197b have a double overlapping lap-joint configuration.

I-channel 398 serves as an intermediate span element to align and bind apex portions 392a and 392b to each other. I-channel also serves to provide an axially extending overlie engagement with apex portions 392a and 392b to radially align apex portions 392a and 392b to each other. Further, I-channel 398 extends within the gap 394, which could otherwise be a closed seam between apex portions 392a and 392b. Adhesive may be inserted within overlapping joining interfaces 396a, 396b, 397a, and 397b to further secure I-channel 398 to both apex portion 392a and 392b. The I-channel 398 may be configured as a circumferential profile of a general "I" shape as shown that extends circumferentially around the entire radially inboard periphery of the apex region 391 as shown. Alternatively, the I-channel 398 may constitute one of a series of individual clips of the profile shown that are arranged at discreet circumferential locations around the radially inboard periphery of the apex region 391.

Figure 4H:
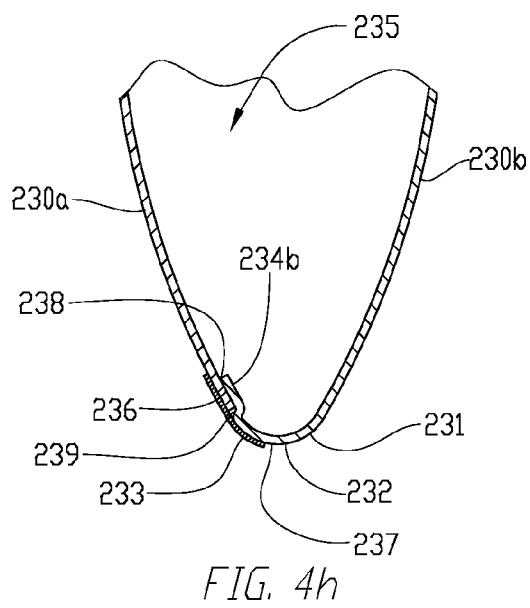

FIG. 4h shows two opposing rim shells 230a and 230b. Rim portion 230b includes apex portion 232 and flange 234b. Note that rim shell 230a does not have an apex portion per se that extends well into the apex region 231. Rim shell 230a is joined to the flange 234b at an overlapping seam 236 as shown and as described previously. Seam 236 includes an interior seam periphery 238 adjacent internal cavity 235 and an exterior seam periphery 239. While many of the embodiments of the present invention describe opposing rim shells that are generally symmetrical to each other, the embodiment of FIG. 4e is a representative embodiment that describes opposing rim shells that are asymmetrical to each other. Further, it should be noted that the seam 236 is not directly coincident with the radially inboard true apex 237 of the apex portion 232, but is instead is located radially outboard of the true apex 237 and closer to the periphery of the apex region 231. Adhesive tape 233 a is next applied to adhere to both apex portion 232a and 232b and to span across exterior seam periphery 239 to serve as an intermediate element to bind rim shell 230a to rim shell 230b.

Figure 4I:
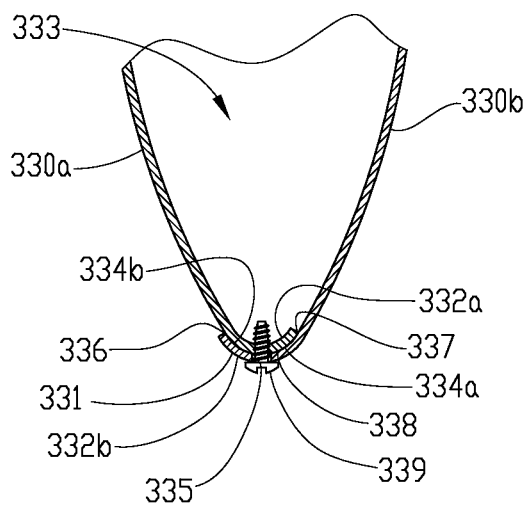

FIG. 4i describes an embodiment where the two apex portions are bound to each other by means of a mechanical fastener. Rim shells 330a and 330b include respective apex portions 332a and 332b and respective joining surfaces 334a and 334b and are joined to each other at a seam 338, which includes an interior seam periphery 337 adjacent internal cavity 333 and an exterior seam periphery 336 adjacent the exposed exterior of rim shells 330a and 330b. Seam 338 is commonly considered a "lap joint" type of arrangement and may include adhesive and/or fasteners to span between apex portions 332a and 332b to augment this joinder. Alternatively, no adhesive may be necessary and joining surfaces 334a and 324b may simply be near each other or otherwise pressed against each other via preload provided by the stiffness of the rim shells 330a and 330b. Rim shell 330b includes a clearance hole 335 at apex region 332b to accept screw 329. Screw 339 a is next passed radially outwardly through clearance hole 335 and threadably pierced through apex portion 332b in a common piercing and self tapping arrangement. Screw 339 serves as an intermediate element that spans between apex portions 332a and 332b to retain and bind rim shell 330a to rim shell 330b in the apex region 331. It is noted that screw 339 serves as an internal spanning element to span between rim shells 330a and 330b and to fasten them to each other at a location within (i.e. internal to) the seam 338 itself, at a point midway between interior seam periphery 337 and exterior seam periphery 336. This is in contrast to the embodiment shown in FIG. 4d, where the adhesive tape 329 is located external and adjacent to the exterior seam periphery 326 to fasten rim shells 320a and 320b to each other. Screw 339 is merely representative of a wide range of mechanical fasteners well known in industry that may be utilized to secure the apex portions to each other. Further, these alternate mechanical fasteners may be utilized in conjunction with a wide range of rim shell configurations, including those illustrated in the instant specification.

Figure 4J:
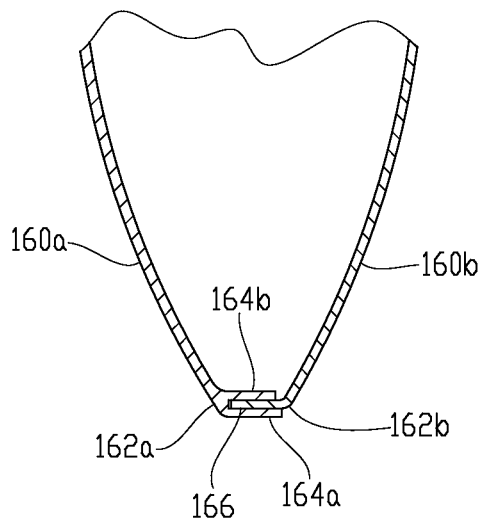

FIG. 4j shows two opposing rim shells 160a and 160b with corresponding apex portions 162a and 162b. Apex portion 162a includes two axially-extending collars 164a and 164b while apex portion 162b includes one opposing axially extending collar 166. Collar 166 is nested between collars 164a and 164b in an axially overlapping double-lap joint configuration as shown. In comparison with the single-lap seam 152 of FIG. 3e, this double-lap joint provides increased surface area of overlap and provides improved alignment between mating collars 166 and 164a and 164b. Adhesive and/or fasteners may be utilized to lock collars 166 and 164a and 164b together. Thus, rim shells 160a and 160b are joined to each other at the seam where they meet in apex region 161.

Figure 4K:
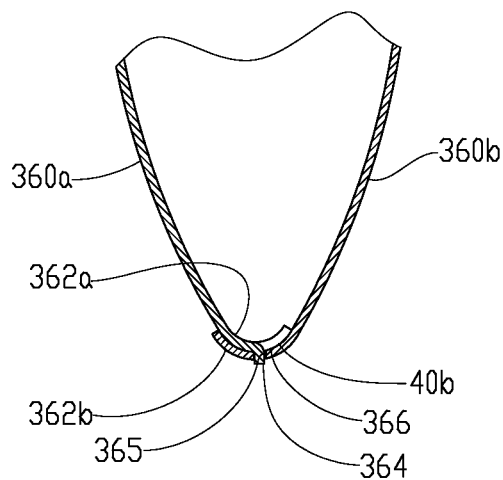

FIG. 4k shows two opposing rim shells 360a and 360b with corresponding apex portions 362a and 362b respectively and a seam 366 therebetween. Apex portion 362a includes radially inwardly extending tab 364. Apex portion 362b includes a slot or hole 365 therethrough extending along a generally radial axis. Rim shells 360a and 360b are assembled to each other such that tab 364 extends radially inwardly through hole 365 such that tab 364 is engaged to hole 365, thereby engaging and locking apex portions 362a and 362b to each other. Tab 364 may be pre-bent in the radially inwardly orientation shown prior to assembly between apex portions 362a and 362b. Rim shells 360a and 360b may be flex slightly to permit this assembly. Alternatively, apex portions 362a and 362b may be first assembled together and tab 364 may be subsequently bent or formed into the radially inwardly extending orientation shown such that it extends through hole 365 as shown. The engagement between tab 364 and hole 365 serves to bind apex portions 362a and 362b to each other. Tab 364 may be considered as a internal spanning element that is integral and monolithic with rim shell 360a that serves to span across the seam 366, at a location within (i.e. internal to) the seam 366, to retain and/or bind apex portions 362a and 362b to each other.

Figure 5A:
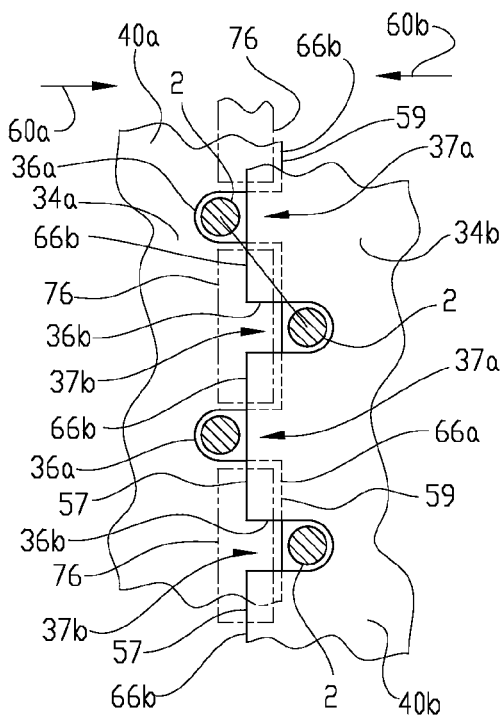
FIG. 5a is a detail view of the rim assembly of FIG. 2d as seen generally in the direction 43-43 of FIG. 2d, with spokes in cross section and detailing the interface of the slots and the spoke, including adhesive tape spanning across the seam.

FIG. 5a provides a detail view of the embodiment of FIGS. 2a-i showing the interaction of the rim shells 34a and 34b with the spokes 2. When rim shells 34a and 34b are assembled to each other in the directions 60a and 60b respectively, it may be seen that apex portion 40a of rim shell 34a has an axial overlap with apex portion 40b of rim shell 34b. Spokes 2 are introduced through open portions 37a and 37b until they are nested in their corresponding slots 36a and 36b as shown. When apex portion 40a is snap fit with apex portion 40b, edge 66a overlaps edge 66b and apex portion 40a partially covers slot 36b to closely follow the cross section of the spoke 2. Simultaneously, apex portion 40b partially covers slot 36a. Thus, the slots 36a and 36b allows easy assembly of the rim shells 34a and 34b to each other while the spokes are already laced to the outer rim 32 (not shown). Also, the overlapping apex portions 40a and 40b serve to partially cover the slots for enhanced aerodynamics and a clean aesthetic appearance. Adhesive tape 76 is next applied to adhere to both apex portion 40a and 40b and to span across external periphery 57 to serve as an intermediate element to bind rim shell 62a to rim shell 62b in the apex region 49. In order to limit interference with slots 36b, multiple pieces of adhesive tape 76 are applied at circumferentially separated locations with circumferential gaps therebetween as shown.

Figure 5B:
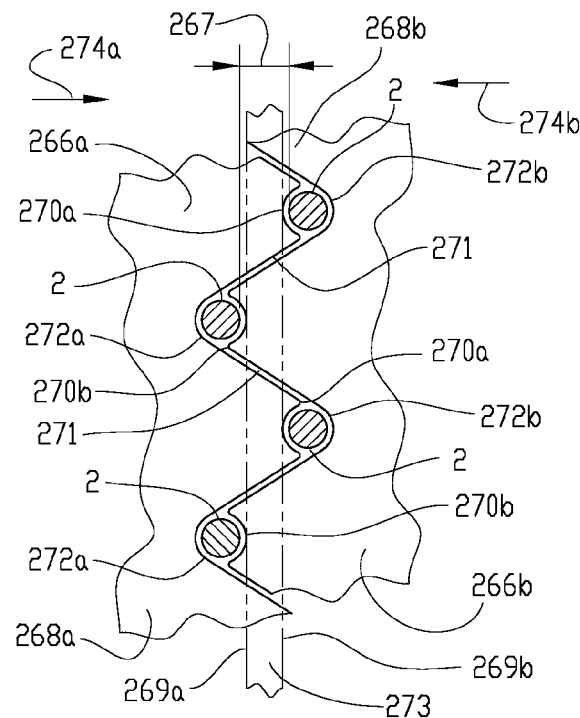
FIG. 5b is a detail view similar to FIG. 5a, and illustrating an alternate configuration of the rim assembly, with spokes in cross section and detailing the interface of nested apex portions and the spoke, including adhesive tape spanning across the seam.

FIG. 5b shows an embodiment where rim shells 266a and 266b include corresponding apex portions 268a and 268b, each with associated tongues 270a and 270b and grooves 272a and 272b. With rim shells 266a and 266b assembled together in the generally axial directions 274a and 274b respectively as shown, apex portions 268a and 268b do not overlap as in FIG. 5a. Instead, tongue 270a abuts and nests in groove 272b at an abutting interface 271 to closely surround the cross section of the spoke 2 within the abutting interface 271. Similarly, tongue 270b nests in groove 272a at an abutting interface 271 to closely surround the cross section of the spoke 2 within the abutting interface 271. Grooves 272a and 272b may be considered as open-ended openings of their associated rim shells 266a and 266b respectively, in a manner similar to slots 36a and 36b of FIG. 5a. In FIG. 5b, tongues 270a and 270b are circumferentially aligned to extend axially within the opposing grooves 272b and 272a respectively to create the staggered zig-zag abutting interface 271 shown here. Thus, the tongues 270a and 270b and grooves 272a and 272b allows easy assembly of the rim shells 266a and 266b to each other while the spokes are already laced to the outer rim (not shown). Also, the spokes 2 are closely surrounded by apex portions 268a and 268b for enhanced aerodynamics and a clean aesthetic appearance. Adhesive tape 273 is next applied to adhere to both apex portions 268a and 268b and to span across abutting interface 271 to serve as an intermediate element to bind apex portions 268a to 268b. In contrast to the multiple pieces of adhesive tape 76, as shown in FIG. 5a, FIG. 5b shows a continuous piece of adhesive tape 273 that extends to span circumferentially across the seam or abutting interface 271 at several locations. It is envisioned that the adhesive tape 273 may extend continuously around the full circumference of apex portions 268a and 268b. Further, it is noted that spokes 2 are staggered in the conventional manner, providing an axial stagger or gap 267 adjacent apex portions 268a and 268b and between opposing spokes 2. As such, the circumferential edges 269a and 269b of adhesive tape 273 may be straight and may extend circumferentially to pass within the gap 267 without interfering with the spokes 2.

Figure 5C:
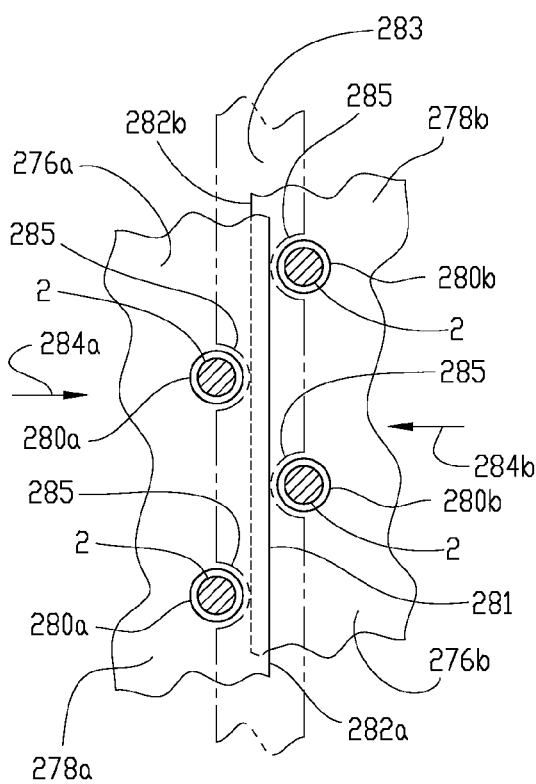
FIG. 5c is a detail view similar to FIG. 5a, and illustrating a second alternate configuration of the rim assembly, with spokes in cross section and detailing the interface of the apex portions and the spoke, including through holes, and including adhesive tape spanning across the seam.

FIG. 5c shows an embodiment where rim shells 276a and 276b include corresponding apex portions 278a and 278b, each with associated holes 280a and 280b and edges 282a and 282b. With rim shells 276a and 276b assembled together in the generally axial directions 284a and 284b respectively as shown, apex portions 278a and 278b overlap as shown and holes 280a and 280b are aligned to accept spokes 2 as shown. Unlike the embodiments of FIGS. 5a and 5b, the holes 280a and 280b are closed and surrounded by rim shell material. Thus, the spokes must be threaded through holes 280a and 280b to be laced to the outer rim (not shown) after the rim shells 276a and 276b are assembled together. This adds additional complexity to the manufacture and service of the wheel. Nevertheless, spokes 2 are closely surrounded by holes 280a and 280b for enhanced aerodynamics and a clean aesthetic appearance. Adhesive tape 283 is next applied to adhere to both apex portions 278a and 278b and to span across exterior seam periphery 281 to serve as an intermediate element to bind apex portions 278a to 278b. It is envisioned that the adhesive tape 283 may extend continuously around the full circumference of apex portions 278a and 278b. In contrast to the straight edges 269a and 269b of the adhesive tape 273 of FIG. 5b, FIG. 5c shows the edges of adhesive tape 283 to have openings or notches 285 to provide clearance for the spokes 2 and holes 280a and 280b.

Figure 5D:
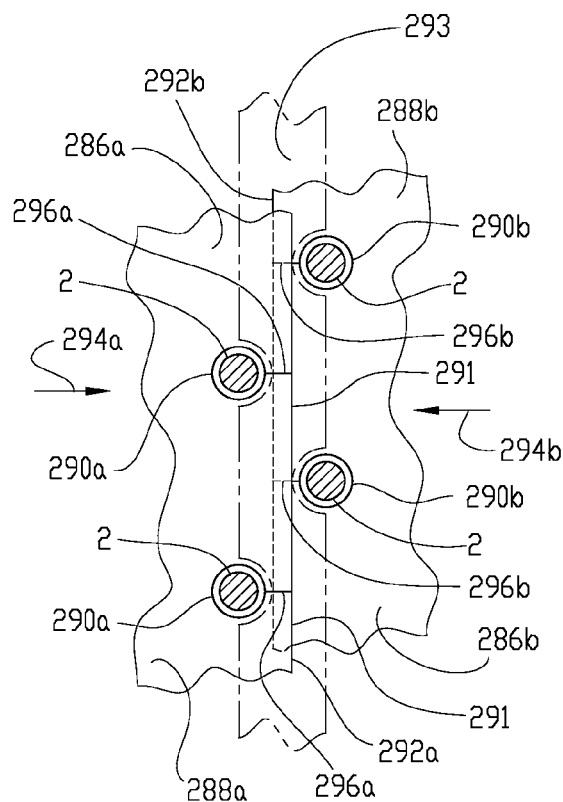
FIG. 5d is a detail view similar to FIG. 5a, and illustrating a third alternate configuration of the rim assembly, with spokes in cross section and detailing the interface of the apex portions and the spoke, including through holes with access split, including adhesive tape spanning across the seam.

FIG. 5d shows an embodiment very similar to the embodiment of FIG. 5c where rim shells 286a and 286b include corresponding apex portions 288a and 288b, each with associated holes 290a and 290b and edges 292a and 292b. With rim shells 286a and 286b assembled together in the generally axial directions 294a and 294b respectively as shown, apex portions 288a and 288b overlap as shown and holes 290a and 290b are aligned to accept spokes 2 as shown. Unlike the embodiment of FIG. 5c, the holes 290a and 290b include access slits 296a and 296b, where the corresponding apex portions include a self-closing split or slit extending and communicating between corresponding holes 290a and 290b and edges 292a and 292b. Slits 296a and 296b may be passively spread or curled by the spoke 2 to permit apex portions 288a and 288b to be moved past spoke 2 during assembly until holes 290a and 290b are aligned with their associated spokes 2. Upon assembly, with the spokes 2 moved beyond slits 296a and 296b, these slits snap back into their closed position to surround the cross section of the spokes 2. Thus, the slits 296a and 296b allow for easy assembly of the rim shells 286a and 286b to each other while the spokes are already laced to the outer rim (not shown). Also, the spokes 2 are closely surrounded by apex portions 288a and 288b for enhanced aerodynamics and a clean aesthetic appearance. Adhesive tape 293 is next applied to adhere to both apex portions 288a and 288b and to span across exterior seam periphery 291 and across slits 296a to serve as an intermediate element to bind apex portions 288a to 288b.

While my above description contains many specificities, these should not be construed as limitations on the scope of the invention, but rather as exemplifications of embodiments thereof. For example:

While many of the embodiments of the present invention describe opposing rim shells that are generally symmetrical to each other, these rim shells need not necessarily be symmetrical. As such an example, the embodiment of FIG. 4h describes opposing rim shells that are asymmetrical to each other.

While the outer rim and rim shell elements shown herein are shown as generally continuous circumferential elements, it is also envisioned that any of these elements may be discontinuous circumferential elements. In other words, the circumference may be interrupted or split in one location to create a circumferential "C"-shaped element or may be interrupted or split in a multiplicity of circumferentially spaced locations to create a multi-piece circumferential element. Further, the element(s) may not need to be circumferential at all, but may instead be located in an isolated region of the circumference of the rim assembly.

While the present invention describes a vehicle wheel with two axially spaced flanges, the number of flanges, as well as their orientation are not a requirement for the performance and function of the rim shells. For example, the rim shells of the present invention may alternatively be utilized with a compression-spoke wheel with only a single hub flange.

While many of the embodiments described herein utilize pre-formed rim shell(s) and outer rim components, it is also envisioned that one or another of these components may alternatively be formed or molded in place. Further, one component may be formed against another to insure proper matching geometry. For example, the rim shell 100 of FIG. 3a may be molded by inflating a temporary internal bladder within cavity 116 in a method well known in industry for molding composite rims. The bladder may be utilized to press the outboard portion 110 against the joining surface 104, creating matched geometry and simultaneously bonding the rim shell 100 to the outer rim 102 during molding. A seam may be maintained between the apex portions 108a and 108b, either during molding or by splitting the rim shell in this location subsequent to molding.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

The invention claimed is:

1. A vehicle wheel, comprising:
a peripheral rim including a radially outboard spoke bed portion and an apex region radially inboard from said spoke bed portion;
a central hub with a hub flange;
an axial axis of rotation;
a plurality of spokes extending between the peripheral rim and central hub, wherein said spokes have a second portion with a direct structural connection to said spoke bed portion and a first portion opposed to said second portion and connected to said central hub, and a span portion extending between said spoke bed portion and said central hub;
wherein said apex region includes a first apex portion and a second apex portion adjacent said first apex portion and a seam between said first apex portion and said second apex portion;

wherein said first apex portion is adjacent said second apex portion at said seam to enclose a circumferential internal cavity radially inboard of said spoke bed portion;

wherein said internal cavity includes a radially extending gap between said spoke bed portion and said seam; and including a spanning element to span across said seam to retain said first apex portion to said second apex portion.

2. A vehicle wheel according to claim 1, wherein said peripheral rim constitutes an assembly including: (i) at least one outer rim element that includes said spoke bed portion and (ii) at least one rim shell element that includes at least one of said first apex portion and said second apex portion, wherein said outer rim element is connected to said rim shell element at an outer joining interface.

3. A vehicle wheel according to claim 2, including a plurality of said rim shells, wherein a first of said rim shells includes said first apex portion and wherein a second of said rim shells includes said second apex portion.

4. A vehicle wheel according to claim 2, wherein said rim shell is a singular element including said first apex portion and said second apex portion.

5. A vehicle wheel according to claim 2, wherein said rim shell is a continuous circumferential element.

6. A vehicle wheel according to claim 2, wherein said outer rim element includes a radially inwardly projecting extension portion and wherein said extension portion serves to at least one of retain and engage said rim shell element to said outer rim element.

7. A vehicle wheel according to claim 2, wherein said outer joining interface includes a snap fit engagement.

8. A vehicle wheel according to claim 2, wherein said seam is independent of said outer joining interface.

9. A vehicle wheel according to claim 2, including the absence of structural joinder between said spoke and said rim shell element to resist spoke tension forces.

10. A vehicle wheel according to claim 1, including direct contact between said first apex portion and said second apex portion at said seam.

11. A vehicle wheel according to claim 1, including a gap between said first apex portion and said second apex portion at said seam.

12. A vehicle wheel according to claim 1, including an inner joining interface at said seam, wherein said first apex portion is joined to said second apex portion at said inner joining interface.

13. A vehicle wheel according to claim 12, wherein said first apex portion is directly connected to said second apex portion at said inner joining interface.

14. A vehicle wheel according to claim 12, wherein said inner joining interface includes a snap fit engagement.

15. A vehicle wheel according to claim 1, wherein said seam includes a butt joint.

16. A vehicle wheel according to claim 1, wherein said seam includes a generally radial overlapping interface.

17. A vehicle wheel according to claim 1, wherein said inner seam includes a generally axial overlapping interface.

18. A vehicle wheel according to claim 1, wherein said spanning element is a circumferentially continuous spanning element that generally extends along the full circumference of said apex region about said axial axis.

19. A vehicle wheel according to claim 1, wherein said spanning element is a circumferentially discontinuous spanning element that extends along a portion of the full circumference of said apex region about said axial axis.

20. A vehicle wheel according to claim 19, including a multiplicity of said spanning elements that are discreet and are circumferentially displaced from each other.

21. A vehicle wheel according to claim 1, wherein said spanning element is an auxiliary element discreet from both said first apex portion and said second apex portion.

22. A vehicle wheel according to claim 1, wherein said spanning element is at least one of integral and monolithic with one of said first apex portion and said second apex portion.

23. A vehicle wheel according to claim 1, wherein said spanning element is an exterior spanning element that spans external to said seam and across an exterior periphery of said seam.

24. A vehicle wheel according to claim 1, wherein said spanning element is an interior spanning element that spans external to said seam and across an interior periphery of said seam adjacent said internal cavity.

25. A vehicle wheel according to claim 1, wherein said spanning element is an internal spanning element that spans internally within the bounds of an interior periphery and an exterior periphery of said seam.

26. A vehicle wheel according to claim 1, wherein said spanning element is adhesive tape.

27. A vehicle wheel according to claim 1, wherein said spanning element is a cover plate.

28. A vehicle wheel according to claim 1, wherein said spanning element is a mechanical fastener.

29. A vehicle wheel according to claim 1, wherein said spanning element is a joining clip.

30. A vehicle wheel according to claim 1, wherein said spanning element is a tab of said first apex portion that is engaged to said second apex portion.

31. A vehicle wheel according to claim 1, wherein said spanning element includes a radially extending overlie engagement with at least one of said first apex portion and said second apex portion.

32. A vehicle wheel according to claim 1, wherein said spanning element includes an axially extending overlie engagement with at least one of said first apex portion and said second apex portion.

33. A vehicle wheel according to claim 1, including a service temperature at which said vehicle wheel is anticipated to be utilized, wherein said spanning element includes a joining interface with at least one of said first apex portion and said second apex portion and wherein said joining interface is a permanent joining interface where said joining interface may not be disassembled at the service temperature without damaging at least one of said first apex portion and said second apex portion.

34. A vehicle wheel according to claim 1, wherein said spanning element includes a joining interface with at least one of said first apex portion and said second apex portion and wherein said joining interface may be disassembled without damaging said first apex portion and said second apex portion.

35. A vehicle wheel according to claim 1, including a snap fit engagement between said spanning element and at least one of said first apex portion and said second apex portion.

36. A vehicle wheel according to claim 1, wherein said spanning element includes a joining interface with at least one of said first apex portion and said second apex portion and wherein said joining interface is an adhesive joining interface.

37. A vehicle wheel according to claim 1, wherein said plurality of said spokes are axially staggered, including an axial gap between said axially staggered spokes at said apex region, wherein said spanning element extends within said axial gap.

38. A vehicle wheel according to claim 1, wherein at least one of said first apex portion and said second apex portion includes an opening therethrough, and wherein said spoke extends through said opening, and wherein said opening is an enclosing opening that surrounds the cross section of said spoke.

39. A vehicle wheel according to claim 1, wherein at least one of said first apex portion and said second apex portion and said span element includes an opening therethrough and an edge, and wherein said opening communicates with said edge, and wherein said spoke extends through said opening.

40. A vehicle wheel according to claim 39, wherein at least one of (i) said spoke may be assembled to said opening in a generally axial direction to pass between said edge and said opening, and (ii) said first apex portion may be assembled to said spoke in a generally axial direction to pass between said edge and said opening.

41. A vehicle wheel according to claim 39, wherein said spoke includes an enlarged portion of larger cross-section dimension and a mid portion of correspondingly smaller cross-section dimension located radially inboard of said enlarged portion, and wherein said opening has a width dimension aligned with said cross-section dimension, and wherein said mid portion is located within said opening and wherein the cross sectional dimension of said enlarged portion is greater than the corresponding width dimension of said opening.

42. A vehicle wheel according to claim 39, wherein said opening partially surrounds the cross section of said spoke, and wherein at least two of said first apex portion, said second apex portion, and said span element are assembled together to close said opening to fully surround the cross section of said spoke.

* * * * *